United States Patent
Kunimoto et al.

(10) Patent No.: US 7,316,267 B2
(45) Date of Patent: Jan. 8, 2008

(54) HEAT PUMP WATER DEVICE

(75) Inventors: Keijiro Kunimoto, Mie (JP); Takeshi Watanabe, Nara (JP); Ryuta Kondo, Nara (JP); Satoshi Matsumoto, Hyogo (JP); Satoshi Imabayashi, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 300 days.

(21) Appl. No.: 10/479,690

(22) PCT Filed: Feb. 10, 2003

(86) PCT No.: PCT/JP03/01366

§ 371 (c)(1),
(2), (4) Date: Dec. 4, 2003

(87) PCT Pub. No.: WO03/069236

PCT Pub. Date: Aug. 21, 2003

(65) Prior Publication Data

US 2004/0144528 A1    Jul. 29, 2004

(30) Foreign Application Priority Data

Feb. 12, 2002 (JP) .............................. 2002-033648
Feb. 12, 2002 (JP) .............................. 2002-033650
Feb. 19, 2002 (JP) .............................. 2002-041048

(51) Int. Cl.
*F25B 29/00* (2006.01)
*F25B 13/00* (2006.01)

(52) U.S. Cl. ..................... 165/240; 62/324.1; 62/238.6

(58) Field of Classification Search ................ 165/299, 165/298, 48.1, 240; 62/238.6, 324.1, 196.4
See application file for complete search history.

(56) References Cited

U.S. PATENT DOCUMENTS 6,370,896 B1 *   4/2002   Sakakibara et al. ........... 62/201

(Continued)

FOREIGN PATENT DOCUMENTS

EP         1167896 A2      1/2002

(Continued)

OTHER PUBLICATIONS

International Search Report for PCT Application No. PCT/JP03/01366 mailed May 27, 2003 with English translation Form PCT/ISA/210.

*Primary Examiner*—Ljiljana Ciric
(74) *Attorney, Agent, or Firm*—RatnerPrestia

(57) ABSTRACT

A flash water heater using a heat pump includes a heat exchanger in which a refrigerant flow path exchanges heat with a water flow path. Tap water is led directly to the water flow path, and hot water supplied from the water flow path is used. The water heater includes at least one of the following elements: 1) a load setter for setting a heating amount in the heat exchanger, and a heating controller for regulating a heating amount in response to an amount set by the load setter; 2) a heater for heating water flowing through the water flow path in the heat exchanger and water flowing the path before and after the heat exchanger; 3) plural compressors; and 4) plural heat-pump cycles. The water heater is excellent in start-up of hot water temperature when the hot water supply starts, controllability, and efficiency.

21 Claims, 11 Drawing Sheets

U.S. PATENT DOCUMENTS

| | | |
|---|---|---|
| 6,715,540 B2 * | 4/2004 | Kobayashi et al. ......... 165/240 |
| 6,895,768 B2 * | 5/2005 | Sakamoto et al. ......... 62/196.4 |
| 6,904,766 B2 * | 6/2005 | Ito et al. .................... 62/324.1 |
| 7,076,964 B2 * | 7/2006 | Sakakibara ................ 165/48.1 |

FOREIGN PATENT DOCUMENTS

| | | |
|---|---|---|
| JP | 56-58067 | 5/1981 |
| JP | 58-102052 | 6/1983 |
| JP | 60-53733 A | 3/1985 |
| JP | 61-17849 | 1/1986 |
| JP | 61-246541 A | 11/1986 |
| JP | 2-223767 | 9/1990 |
| JP | 09-004865 | 1/1997 |
| JP | 10-253155 A | 9/1998 |
| JP | 10-311597 A | 11/1998 |
| JP | 10-318604 A | 12/1998 |
| JP | 2001-41573 A | 2/2001 |
| JP | 2001-280695 | 10/2001 |
| JP | 2002-5515 A | 1/2002 |
| WO | WO 02/101304 A1 * | 12/2002 |

* cited by examiner

HEAT PUMP WATER DEVICE

THIS APPLICATION IS A U.S. NATIONAL PHASE APPLICATION OF PCT INTERNATIONAL APPLICATION PCT/JP03/01366.

TECHNICAL FIELD

The present invention relates to a flash water heater using a heat pump.

BACKGROUND ART

A flash water heater using combustion of gas or oil has been available as a household item. This device features a quick rise in temperature and a large capacity; however, it causes air-pollution due to exhaust gas as well as combustion noises, and makes the users feel anxious about burning fuel at their places. On the other hand, a heat-pump water heater which stores hot water in a large tank for supplying the hot water, overcomes the problems due to the combustion, and features high heat efficiency because of using a heat pump. However, this water heater needs a large hot water storage tank, which imposes limitations on installation such as a weight and a space. There is an idea to overcome this problem, i.e., use of a heat pump in the flash water heater, however, the heat pump requires a time before heating up the water, this is a different point from a combustion water heater. Therefore, it takes time for a user to get hot water, and the user feels a complaint. In the case of the heat-pump water heater, the hot water supply changes depending on the natural condition such as temperature, humidity, and water temperature. And yet, a flowing amount of the hot water changes, so that it is difficult to restore quickly a hot water temperature to a certain level and cover a wide range amount of hot water supply. The heat-pump water heater thus has a problem in stable supply of hot water.

Japanese Patent Application Non-Examined Publication No. H02-223767 discloses a flash water heater using a heat pump for overcoming those problems. FIG. 11 shows a schematic diagram of this heat-pump water heater which includes heat-pump cycle 207 that couples compressor 202, radiator 203, decompressor 204, and heat absorber 205 via refrigerant flow path 201 to form a closed circuit. The heat-pump water heater further has the following elements:

heat exchanger 210 including water flow path 209 which exchanges the heat with refrigerant flow path 208 in radiator 203;

water supply pipe 211 for supplying water to water flow path 209;

hot water supply circuit 213 for coupling water flow path 209 to hot water supply terminal 212 such as a shower face or a spout;

temperature sensor 214 disposed at hot water supply circuit 213 for detecting a temperature of the hot water to be spouted; and inverter 215 for controlling a rotation speed of compressor 202. Inverter 215 changes an output frequency to compressor 202 in response to a difference between a temperature detected by sensor 214 and a temperature set in advance. In other words, inverter 215 controls such that when a temperature of the hot water to be spouted is lower than the predetermined temperature, the rotation speed of compressor 202 is raised, the temperature of the hot water is higher than the predetermined temperature, the rotation speed of compressor 202 is lowered.

This flash water heater undergoes unstable loads of hot water supply, in particular, a flow rate is varied by a user depending on a purposes of use, so that the load of hot water supply changes drastically. For instance, in the case of a home use water heater, the hot water supply for taking a shower or preparing a bath needs a flow rate as much as 10-20 L/min. However, the hot water supply for washing dishes or a face needs a flow rate as low as 3-5 L/min. A seasonal temperature change in tap water also one of the factors largely varying the load of hot water supply.

The load of hot water supply thus changes drastically depending on a change in flow rate or water temperature. On the other hand, a conventional heat-pump water heater, which controls the heat quantity of hot water supply by changing the rotation speed of the compressor in response to a difference between a temperature of the hot water to be spouted and a predetermined temperature, produces inconvenience of responsiveness to the control and stability of the control. For instance, if a control gain, a coefficient of a rotation speed of compressor and a temperature difference between the hot water and the predetermined temperature, is lowered for the more stable control, the compressor lowers its change in its rotation speed with respect to a change in the temperature difference. As a result, the temperature of the hot water changes only moderately and it takes time before the temperature reaches the predetermined one. The temperature of the hot water does not steadily rest at the predetermined one due to frequent changes by offset in flow rates or water temperatures. If the control gain is raised, a stable control can be expected for a large flow rate having a large load of hot water supply because a change in hot water temperature is small with respect to a change in the rotation speed of the compressor. However, in the case of a small flow rate, the temperature of hot water changes sharply in response to the change in the rotation speed of the compressor, so that the rotation speed control changes sharply, which does not stabilize the hot water temperature and also causes hunting due to phase-shift between a change in hot water temperature and a change in rotation speed. As a result, the control may be diverged.

The flash water heater employing a heat pump needs time for start-up of pressure and temperature in overall heat pump cycle before starting hot water supply, so that hot water supply from the water flow path in the heat exchanger delays comparing with that of a gas water heater. In a conventional structure, a difference between a hot water temperature and a predetermined temperature is only a factor to set a rotation speed of a compressor at starting the hot water supply. Therefore, the rotation speed of the compressor is set at a high level almost uniformly at the start-up when the hot water stays at a low temperature regardless of a large flow rate or a small flow rate. As a result, in the case of a small flow rate, the temperature of hot water supplied from the heat exchanger rises sharply, which causes an overshoot. This phenomenon produces inconveniences such that the hot water spouting becomes hotter than the predetermined temperature, and a rise of temperature of the radiator causes a pressure at the outlet of the compressor to rise abnormally.

Further, the conventional heat-pump water heater needs to change an operation of a single compressor 202 to alter the rotation speed; however, the control by changing the rotation speed of the single compressor has a limit to a controllable range. For instance, it cannot control such a wide range from a large flow rate for taking a shower and preparing a bath simultaneously in winter to a very small flow rate for washing dishes in summer. Thus some inconveniences occur such as lowering the temperature in taking a shower or spouting out too hot water in washing dishes.

Conditions of operating the heat pump cycle are changed due to the changes in temperatures of atmosphere and water and in the load of hot water supply, then the operating efficiency also changes. In the conventional heat-pump water heater, a rotation speed of the compressor is simply changed in response to a temperature of the hot water, so that an operating efficiency is not taken into consideration of the control. Thus the water heater is kept operating even in a low heating efficiency, and in some condition, the efficiency lowers so badly that the device cannot perform its capacity, and also the running cost becomes expensive.

On the other hand, in order to shorten a time needed for raise the temperature of hot water spouting at start-up, a new structure is proposed such that a hot water storage tank is disposed for exchanging the heat with the radiator, and the tank surrounds the compressor. This structure allows storing hot water in supplying hot water, and maintaining the compressor warm when the supply is stopped. Thus the temperature of hot water sharply rises when the supply restarts.

However, cooling off the tank lowers the temperature of the compressor, and the start-up of the heat pump cycle delays on the contrary because the tank deprives the compressor of heat. On top of that, since hot water is supplied from the tank, the hot water spouting becomes cool if the temperature of the tank lowers, and the hot water does not become hot until the temperature of hot water in the tank rises high. Therefore, it takes much more time before supplying hot water from a cooled storage tank.

The conventional heat-pump water heater, as discussed above, heats and controls the water regardless of the load amount of hot water supply, so that it is difficult to deal with a wide range of the load of hot water supply. It is also difficult for the conventional heater to be compatible with both of the responsiveness and the stableness to the control of hot water temperature, and yet, the heater sometimes delays the start-up of the hot water temperature, so that the efficiency of the heater is lowered.

DISCLOSURE OF THE INVENTION

An hot water device (a water heater) of the present invention has the following elements:
a heat-pump cycle including:
  a compressor;
  a radiator;
  a decompressor;
  a heat absorber; and
  a refrigerant flow path that couples the foregoing elements together into a closed circuit;
a heat exchanger including a water flow path that exchanges heat with the refrigerant flow path;
a water supply pipe for supplying tap-water to the water flow path;
a hot water supply circuit for leading water from the water flow path to a hot water supply terminal; and
anyone of the elements below:
  1. a load setter for setting a heating amount in the heat exchanger and a heating controller for controlling a heating amount in response to the amount set by the load setter;
  2. a heater for heating the water flowing in a water flow path of the heat exchanger and also the water flowing in the water flow paths before and after the heat exchanger;
  3. a plurality of compressors; and
  4. a plurality of heat pump cycles.

DETAILED DESCRIPTION OF PREFERRED EMBODIMENTS

Exemplary embodiments of the present invention are demonstrated hereinafter with reference to the accompanying drawings. In the respective embodiments, elements similar to those in a previous embodiment have the same reference marks as those in the previous embodiment, and details descriptions thereof are omitted.

Exemplary Embodiment 1

Figure 1:
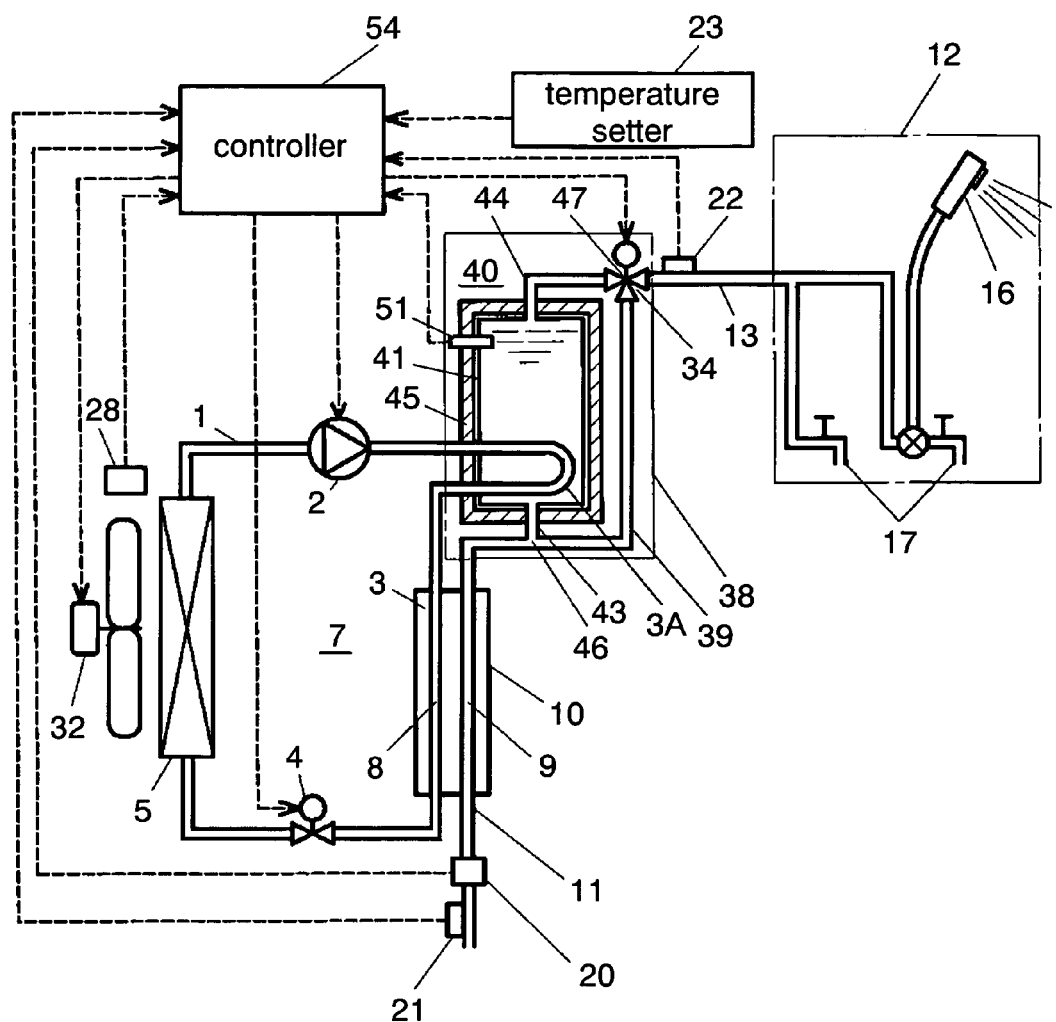
FIG. 1 shows a structure of a heat-pump water heater in accordance with a first exemplary embodiment of the present invention.

FIG. 1 shows a structure of a heat-pump water heater (a heat-pump hot water device) in accordance with the first exemplary embodiment of the present invention. In FIG. 1, heat pump 7 forms a closed circuit including compressor 2, first radiator 3A, second radiator 3, decompressor 4, heat absorber 5, and refrigerant flow path 1 that couples the foregoing elements in the closed circuit.

Heat pump cycle 7 uses e.g. carbon dioxide gas as refrigerant, and a refrigerant pressure rises higher than a critical pressure, namely, cycle 7 is a supercritical pressure heat pump cycle. Compressor 2 is driven by a built-in electrical motor (not shown), and compresses the refrigerant sucked to the critical pressure before discharging the refrigerant.

Heat exchanger 10 has water flow path 9 which exchanges the heat with refrigerant flow path 8 of second radiator 3. Water supply pipe 11 supplying tap-water directly to water flow path 9 is coupled to hot water supply circuit 13 which leads hot water supplied from water flow path 9 to hot water supply terminal 12 such as shower face 16 or spout 17.

Heater 38 for heating the water in hot water supply circuit 13 includes heat accumulator 40 coupled in parallel with upper stream section 39 of circuit 13.

Heat accumulator 40 includes hot water storage tank 41 for storing water flowing into circuit 13 and mixing valve 34 for mixing the flowing water in upper stream section 39 and accumulator 40. Storage tank 41 includes incoming pipe 43 disposed at the bottom, outgoing pipe 44 at the upper end, first radiator 3A at the lower section, and is covered with heat insulator 45.

First radiator 3A works also as a heat retainer for keeping a temperature of a heat accumulating mass (storage temperature) in storage tank 41 at a given temperature. Hot water supply circuit 13 is branched at branch 46 into upper stream section 39 and incoming pipe 43, and merges at confluence section 47 from upper stream section 39 and outgoing pipe 44. Mixing valve 34 is disposed at confluence section 47.

In heat exchanger 10, a flowing direction of refrigerant flow path 8 is opposite to a flowing direction of water flow path 9, and both of path 8 and path 9 are preferably in contact with each other closely for smoother heat transfer. This structure allows uniform heat transfer between path 8 and path 9, so that highly efficient heat exchange can be expected, which results in tapping off hot water at a high temperature.

A size of storage tank 41 accommodates the heat quantity corresponding to the short heat quantity caused by delaying in heat response of heat exchanger 10 at the start of the supply operation. For instance, the temperature of hot water spouting is as low as at 5° C. while a target temperature is 45° C., and the flow rate is 10 L/min, in this case, 3 minutes delay is expected before the hot water at the target temperature is supplied. The short quantity of heat is calculated by the following calculation:

$$(45° C.-5° C.) \times 10 \text{ L/min} \times 3 \text{ min}/860$$

The result is about 1.4 kWh. In the case of compensating this short heat quantity by hot water storage tank 41 at 80° C., the necessary capacity is calculated by the following equation:

$$1.4 \text{ kWh} \times 860/(80° C.-5° C.)=16 \text{ L}$$

Water supply pipe 11 is equipped with flow rate detector 20 for detecting a flow rate of hot water supply circuit 13 and water temperature detector 21 for detecting a temperature of water supplied to heat exchanger 10. Circuit 13 is equipped with hot water temperature detector 22 for detecting a temperature of hot water to be spouted. Storage tank 41 has temperature detector 51 at its upper section for detecting a temperature of hot water inside tank 41. A user can set a target temperature to meet the user's need with temperature setter 23.

When flow-rate detector 20 detects the flow rate, controller 54 calculates a control amount to be fed back by using a deviation between the hot water temperature and the target temperature output from detector 22 and setter 23 respectively. Controller 54 then calculates a load of hot water supply by using the respective amounts detected and set by detectors 21, 20 and setter 23. Further, controller 54 calculates a sum of the feed-back control amount and the load of hot water supply, and controls the rotation speed of compressor 2 based on this sum.

Controller 54 corrects the rotation speed of compressor 2 in response to a value detected by air temperature detector 28, and controls decompressor 4 and fan 32 independently, thereby operating the heat pump cycle 7 optimally. The heating amount in heat exchanger 10 changes proportionately to a change responsive to an air temperature in the rotation speed of compressor 2. Therefore, controller 54 stores in advance a relation between a heating amount in heat exchanger 10 and a rotation speed of compressor 2 at every air-temperature. Then controller 54 sets the rotation speed so that the heating amount of heat exchanger 10 can agree with a necessary heating amount in response to an air temperature. This mechanism allows controlling the hot water supply accurately in response to changes in the air temperature.

Further, controller 54 drives mixing valve 34, thereby controlling a mixture ratio of water flowing from upper stream section 39 vs. water flowing from storage tank 41 in order to bring the hot water temperature close to the target temperature.

Controller 54 drives compressor 2 at a low rotation speed based on a storage temperature detected by detector 51 to carry out a heat retaining operation so that a temperature in tank 41 is kept at a given temperature, e.g., at 80° C. when the supply of hot water is halted. This given temperature for keeping the stored hot water hot can be set higher enough than the target temperature, e.g., 45° C., thereby raising a density of heat accumulation. As a result, a size of storage tank 41 can be downsized.

An operation of the heat-pump water heater having the foregoing structure is demonstrated hereinafter. In FIG. 1, turning on of spout 17 leads tap water through water supply pipe 11. Flow rate detector 20 detects the water flow, and sends the signal to controller 54, thereby driving compressor 2. At this time, if heat pump cycle 7 has been kept cool, water flow path 9 supplies water at a temperature close to the tap water because a pressure and a temperature of the overall cycle do not reach the steady state yet although compressor 2 is driven. Controller 54 sets the mixture ratio of mixing valve 34 at, e.g., 1:1 in a given time, e.g., in 3 minutes after the supply operation starts. Assume that a temperature of tap water is 5° C., storage temperature is 80° C., and a temperature of the water supplied from water flow path 9 is still 5° C., then a temperature of the water supplied from mixing valve 34 is 42.5° C., namely, {(80° C.+5° C.)/2}. Then the temperature at an outlet of path 9 rises gradually; however, the temperature at an outlet of storage tank 41 lowers gradually because cool water at a temperature close to the tap water flows into tank 41 through incoming pipe 43. Thus a temperature at an outlet of mixing valve 34 is kept at a temperature close to the target temperature, e.g., 45° C., because respective waters are mixed.

Mixing valve 34 is thus controlled to compensate a delay of hot water supply from heat exchanger 10 by using the hot water in tank 41 just after the supply operation starts. If heat exchanger 10 is kept warm when the supply operation starts, detector 22 outputs a signal corresponding to a temperature higher than the target temperature. In this case, the mixture ratio is adjusted to increase an amount from upper stream section 39 50 that the hot water temperature becomes close to the target temperature.

When the temperature of heat pump cycle 7 is stabilized, the mixing ratio of valve 34 is changed to take the water mainly from upper stream section 39. At this time, compressor 2 discharges refrigerant gas of high pressure and high temperature, and the gas flows into first radiator 3A and second radiator 3, thereby heating the water stored in tank 41 as well as the water flowing through path 9. The heated water is spouted from hot water supply terminal 12 via upper stream section 39 and hot water supply circuit 13. The refrigerant cooled down in first radiator 3A and second radiators 3 is decompressed by decompressor 4, and then flows into heat absorber 5, where the refrigerant absorbs natural energy such as atmospheric heat and solar heat, then vaporizes into gas before returning to compressor 2.

During the hot water supply operation, controller 54 calculates a control amount to be fed back by using the proportionate integration-differentiation (PID) control, which is known to the public, based on the deviation between the target temperature and a temperature of the hot water spouted. The control coefficients used here, including a proportionate gain, an integral coefficient, and a differential coefficient, are preferably predetermined at optimal values for the responsiveness and steadiness to the control to be compatible with each other. The feedback control may be one of a proportionate integral (PI) control, a proportionate (P) control, a fuzzy control, or a neural control. Controller 54, on the other hand, calculates a load of hot water supply by multiplying the flow rate, which is detected by flow rate detector 20, by the difference between the target temperature and the tap water temperature. This is so called a control amount of feed-forward. Then controller 54 calculates a sum of the feed-forward control amount and the feedback control, and controls the rotation speed of compressor 2 with this sum.

This feedback control is incorporated into the control, so that the temperature of hot water to be spouted can be accurately controlled as close as possible to the target temperature. Use of an integral factor such as the PID control or the PI control among others brings the temperature of the hot water supplied closer to the target temperature. When the temperature of hot water supplied is low just after the supply operation starts, use of a proportionate control factor improves the responsiveness because the hot water is heated and controlled by a large capacity.

On the other hand, the feed-forward control amount is a heating amount needed when the temperature of hot water supply stays stable, so that this control method uses an adequate heating amount and is excellent in steadiness. When a flow rate of the hot water spouting or the temperature of tap water changes sharply, the feed-forward control immediately responds and changes a heating amount. In this respect, the feed-forward control is better than the feedback control in both of responsiveness and steadiness. Controller 54 uses both of the feedback control and feed-forward control and takes advantages of both methods, so that the control excellent in responsiveness as well as in stableness is achievable.

Next, an operation during the halt of the hot water supply is described hereinafter. Although storage tank 41 is covered with heat insulator 45, the storage temperature lowers gradually due to heat dissipation. Controller 54 detects a decrease in the storage temperature with storage temperature detector 51. When the storage temperature decreases to a temperature lower than the lower limit, e.g., 75° C., controller 54 drives compressor 2 at a low rotation speed, and heats the stored water in tank 41 with first radiator 3A to raise the temperature inside tank 41. At this time, second radiator 3 is also heated, but since there is no flow in water flow path 9, no heat is further needed after heat exchanger 10 is warmed up. When the storage temperature exceeds a given temperature, e.g., 80° C., controller 54 stops driving compressor 2. As such, controller 54 carries out the heat retaining operation to keep the storage temperature close to the given temperature.

In this embodiment, first radiator 3A is disposed inside storage tank 41; however it can be closely disposed to the outer wall of tank 41 such as it surrounds tank 41. The temperature of tank 41 is kept hot by first radiator 3A; however, a general heater can do it instead of radiator 3A.

In this embodiment, controller 54 controls mixing valve 34 at start-up of hot water supply such that a mixture ratio is changed in response to a lapse of time and a temperature of the mixture. However, mixing valve 34 can be a switching valve which switches a water flow from storage tank 41 to a water flow from upper stream section 39 or vice versa. In this case, the storage temperature should be set at the target temperature, and when a temperature at the outlet of path 9 rises near to the target temperature, controller 54 controls the switching valve to switch the flow from tank 41 to the flow from upper stream section 39. This structure using the switching valve allows a simpler mechanism and a simpler control than the structure using mixing valve 34, so that use of the switching valve can reduce the cost.

The water heater in accordance with the present embodiment has a super critical pressure heat pump cycle where a refrigerant pressure exceeds the critical pressure. The water flowing through path 9 in heat exchanger 10 is heated by the refrigerant pressured over the critical pressure. Although the water flowing path 9 deprives the refrigerant flowing through path 8 of heat and lowers the temperature of the refrigerant, the refrigerant does not condense because it is pressured over the critical pressure. Therefore, a temperature difference between refrigerant flow path 8 and water flow path 9 can be produced with ease at overall heat exchanger 10, so that hot water at a high temperature is obtainable and highly efficient heat exchange can be expected. This advantage is also achievable with a general heat pump cycle which has a critical pressure or lower. This is applicable to other exemplary embodiments described later.

In heat exchanger 10 of this embodiment, the flow direction of path 8 is opposite to the flow direction of path 9, so that the heat can be transferred uniformly between refrigerant flow path 8 and water flow path 9. As a result, highly efficient heat exchange can be expected and hot water at a high temperature is obtainable. This is also applicable to other embodiments discussed later.

Exemplary Embodiment 2

Figure 2:
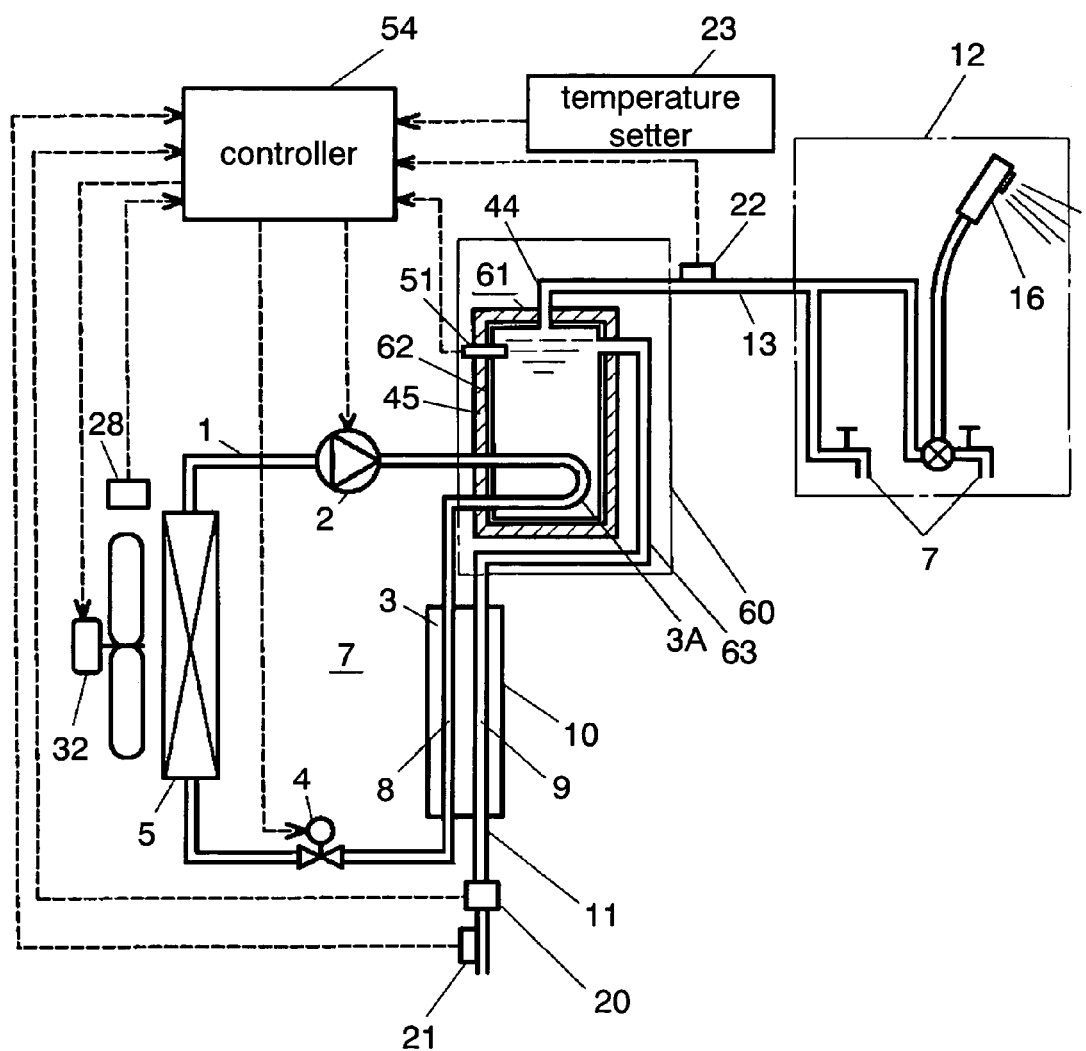
FIG. 2 shows a structure of a heat-pump water heater in accordance with a second exemplary embodiment of the present invention.

FIG. 2 shows a structure of a heat-pump water heater (a heat-pump hot water device) in accordance with the second exemplary embodiment of the present invention. The structure shown in FIG. 2 differs from that of the first embodiment in disposing heater 60 instead of heater 38. Heater 60 is formed of heat accumulator 61 coupled in series with hot water supply circuit 13. Heat accumulator 61 places incoming pipe 63 at an upper section of storage tank 62, so that hot water stored in tank 62 is mixed with the water (hot water) supplied from heat exchanger 10 in storage tank 62. This is also a different point from the first embodiment. A storage temperature of tank 62 during a heat retaining operation is set nearly equal to the target temperature, e.g., 45° C. A capacity of tank 62 increases as the storage temperature lowers.

In the foregoing structure, when the hot water supply starts with heat exchanger 10 has been kept cool, water at a temperature close to the tap water flows into tank 62 through incoming pipe 63. Then the water goes to the bottom of tank 62 due to a temperature difference between the stored hot water and the water flowing in, so that only the hot water flows out from outgoing pipe 44. As a result, immediately after the start of hot water supply, the hot water at a temperature close to the target temperature can be supplied. When the temperature of the water flowing into tank 62 through incoming pipe 63 rises, the water is mixed with the hot water in the upper section of tank 62, and the mixture flows out from outgoing pipe 44. If hot water hotter than the stored hot water is needed to supply, hot water hotter than the stored hot water flows into tank 62 via incoming pipe 63. In this case, since the hot water flowing in has a lighter specific gravity than that of the stored hot water, the hot water flows into the upper end of tank 62 and flows out straightaway from tank 62 via outgoing pipe 44. As such, the hot water is substituted for the water or they are mixed in storage tank 62.

In the present embodiment as discussed above, heat accumulator 61 is coupled in series with hot water supply circuit 13. This simple idea allows compensating a delay of hot water supply at the start-up and achieving stable hot water supply. In storage tank 62, the water and the stored hot water can be mixed into a mixture at an appropriate temperature automatically, so that no mixing section is required and the cost can be reduced.

Exemplary Embodiment 3

Figure 3:
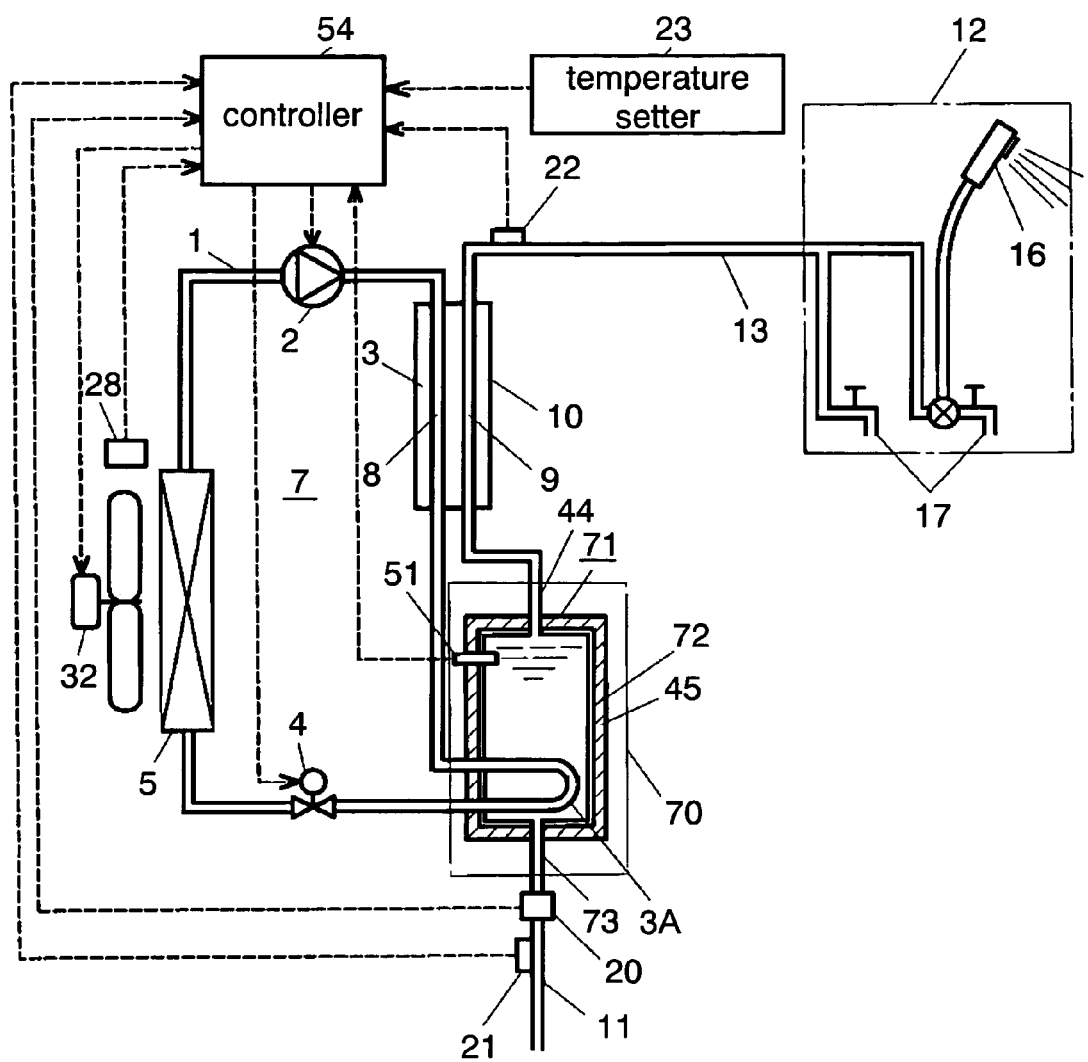
FIG. 3 shows a structure of a heat-pump water heater in accordance with a third exemplary embodiment of the present invention.

FIG. 3 shows a structure of a heat-pump water heater (a heat-pump hot water device) in accordance with the third exemplary embodiment of the present invention. The structure shown in FIG. 3 differs from that of the second embodiment in disposing heater 70 instead of heater 60. Heater 70 is formed of heat accumulator 71 coupled in series with water supply pipe 11. Heat accumulator 71 places incoming pipe 73 at the bottom of storage tank 72. This location is also different from the second embodiment. A storage temperature of tank 72 during a heat retaining operation is set close to the target temperature of hot water supply, e.g., 45° C.

In the foregoing structure, when the hot water supply starts with heat exchanger 10 has been kept cool, cool water flows into the bottom of tank 72 from water supply pipe 11, then the stored hot water flows out via outgoing pipe 44. When heat exchanger 10 increases its heating amount, compressor 2 is controlled its rotation speed responsive to a temperature detected by hot water temperature detector 22, so that the hot water spouted is kept at the target temperature.

In the present embodiment as discussed above, heat accumulator 71 is disposed on the upper stream side of heat exchanger 10. This structure allows accumulator 71 to compensate a delay of heating in exchanger 10. When the heating in exchanger 10 increases, the feedback control of the hot water temperature controls compressor 2, thereby maintaining the target temperature. If the target temperature is changed, the hot water temperature can follow the change immediately. At the start of the hot water supply, heat exchanger 10 is warmed by the hot water stored in tank 72, so that a temperature of heat pump cycle 7 rises quickly.

In this embodiment, heat accumulator 71 is coupled in series with water-supply pipe 11; however, it can be coupled in parallel with pipe 11, and the storage temperature is set higher than the target temperature. Then the water flowing through pipe 11 and the hot water stored are mixed into a mixture at a temperature close to the target temperature before the mixture runs into heat exchanger 10. This structure can downsize heat accumulator 71 due to heat accumulation at a high temperature.

In the first and the second embodiments previously discussed, the heat accumulator is disposed on the downstream side of heat exchanger 10; however, in this third embodiment it is disposed on the upper stream side thereof. The heat accumulator can be disposed in parallel with heat exchanger 10 such as the accumulator bypasses exchanger 10. Such a placement also possible as the accumulator mixes the water flowing through pipe 11 with the water flowing through the accumulator on the upper stream side of heat exchanger 10. Further, the heat accumulator can incorporate heat exchanger 10 with a similar advantage to what is discussed above.

Exemplary Embodiment 4

Figure 4:
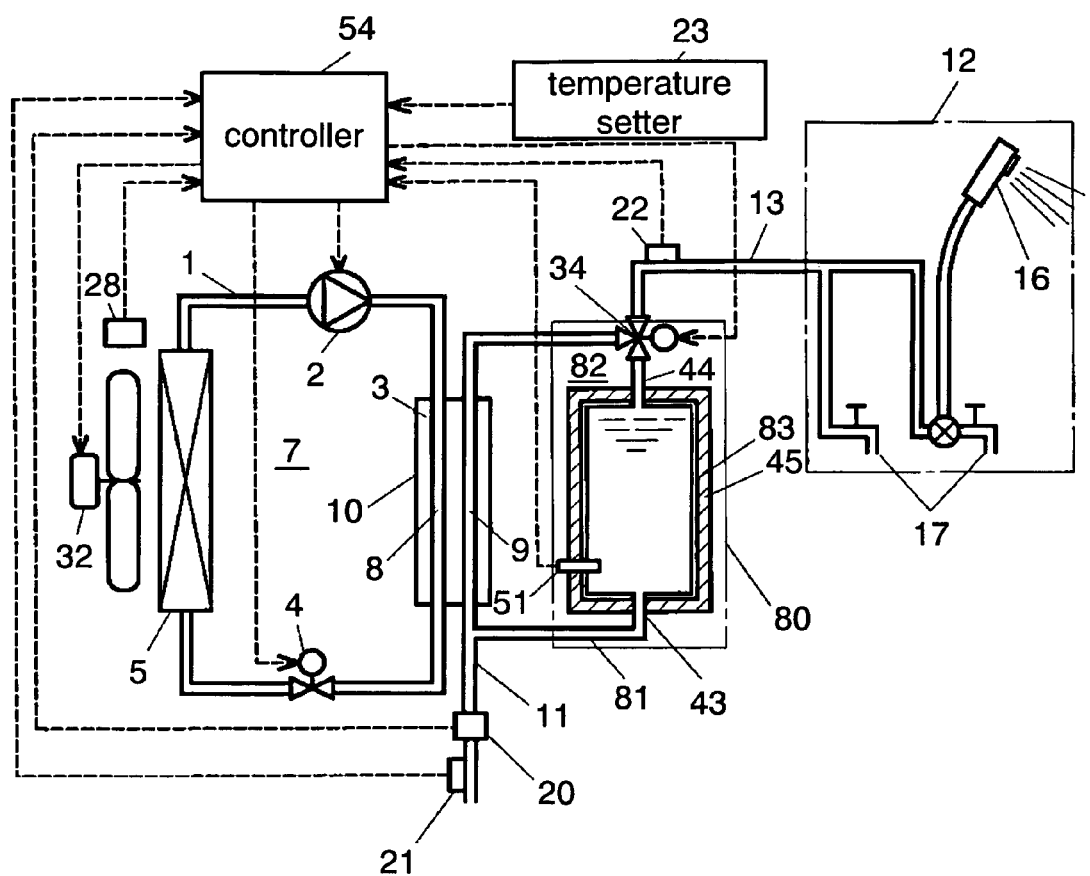
FIG. 4 shows a structure of a heat-pump water heater in accordance with a fourth exemplary embodiment of the present invention.

FIG. 4 shows a structure of a heat-pump water heater (a heat-pump hot water device) in accordance with the fourth exemplary embodiment of the present invention. The structure shown in FIG. 4 differs from that of the first embodiment in disposing heater 80 instead of heater 38. Heater 80 is formed of circulating water path 81 including water flow path 9, and heat accumulator 82 prepared on circulating path 81. In order to keep the circulating water in path 81 and accumulator 82 warm, heat pump cycle 7 is driven to heat water flow path 9 of heat exchanger 10 for producing natural convection in circulating path 81. Heat accumulator 82 includes the following elements:

storage tank 83 having incoming pipe 43 at its bottom and outgoing pipe 44 at its top; and mixing valve 34 for mixing the water flowing from outgoing pipe 44 with the water flowing from water flow path 9, and supplying the mixture to hot water supply circuit 13.

Circulating water path 81 communicates through water flow path 9, mixing valve 34 and storage tank 83 in a loop.

In the foregoing structure, when the hot water supply is started with heat exchanger 10 been kept cool, cool water flows into path 9 and tank 83 from water supply pipe 11, and mixing valve 34 mixes the cool water supplied from path 9 with hot water supplied from tank 83, then supplies the mixture to hot water supply circuit 13. An opening of mixing valve 34 is determined depending on the temperature detected by hot water temperature detector 22, so that a temperature of hot water supplied to circuit 13 is controlled at the target temperature. When a heating amount of exchanger 10 increases, an amount of hot water supplied from tank 83 decreases depending on the temperature detected by detector 22. When a temperature of the water supplied from path 9 reaches the target temperature in the end, the supply from tank 83 is halted.

In the case of halting the hot water supply, an accumulated heat amount is at a lower level because storage tank 83 is supplemented with water during the hot water supply. In this circumstance controller 54, in the first place, restores mixing valve 34 to a mixing status. Then when storage temperature detector 51 detects a temperature decreasing to, e.g., 75° C., controller 54 drives heat pump cycle 7, thereby operating compressor 2 at a low rotation speed. As a result, refrigerant of high temperature and high pressure flows through refrigerant flow path 8, thereby heating water flow path 9, so that a water temperature in path 9 rises up higher than the storage temperature in tank 83. Then the water in path 9 rises due to the temperature difference between path 9 and tank 83, thereby producing convection within circulating water path 81. Then the storage temperature in tank 83 rises, and when detector 51 detects the temperature higher than a given temperature, e.g., 80° C., controller 54 stops operating heat pump cycle 7. The repetition of operation and halt keeps the water circulating in heat accumulator 82 and circulating path 81 hot.

The structure according to the fourth embodiment allows circulating water path 81 that includes water flow path 9 and heat accumulator 82 to be kept hot, and allows supplying the hot water in path 81 when the hot water supply operation starts. Thus the hot water spouted from hot water supply terminal 12 becomes ready quicker. During the halt of heat pump cycle 7, the heat of circulating path 81 heats exchanger 10, so that heat pump cycle 7 becomes ready quicker at start-up.

Circulating water path 81 is kept hot by the heat pump, so that better efficiency than a heater is expected, and this structure is free from being frozen. Further, heat accumulator 82 stores hot water of high temperature, and mixing valve 34 mixes this hot water with water and supplies the mixture at an appropriate temperature, so that if cool water flows into path 81 at starting the hot water supply operation, this structure prevents the temperature of the hot water spouting from being lowered.

In this embodiment, a flow due to natural convection is used for circulating the water in path 81 during the heat retaining operation; however, path 81 can be equipped with a pump, which circulates the water forcibly. In this case, a constant flow rate is obtainable, so that the heating amount in the heat exchanger or the storage temperature can be controlled with ease.

In this embodiment, mixing valve 34 changes the mixing ratio; however, a converging member, which has a fixed mixing ratio, can be used instead of mixing valve 34. In this case, the heating amount in heat exchanger 10 should be controlled by compressor 2 such that the temperature of hot water spouting agrees with the target temperature in response to a decrease in the hot water stored in tank 83. This structure can reduce the cost because of employing simpler mixing valve 34.

In this embodiment, heat accumulator 82 is disposed to circulating water path 81; however, path 81 without accumulator 82 can work. In this case, path 81 is placed such that storage temperature detector 51 can detect a temperature of the water circulating in path 81, and the heat retaining operation is carried out for maintaining the circulating water at a given temperature. This structure can omit heat accumulator 82, thereby reducing substantially the cost, although the temperature of the hot water spouting slightly fluctuates.

In this embodiment, heat pump cycle 7 is driven, thereby heating water flow path 9 of heat exchanger 10, so that natural convection is produced in circulating water path 81 for heating or retaining heat. As such the circulating path is kept hot by the heat pump, and this method results in better efficiency than a method using a heater instead of the heat pump. Further, since the heat pump is driven during the heat retaining operation, the heat pump itself becomes ready quicker. Circulating path 81 can be directly heated by a heater, or storage tank 83 can be directly heated by a heater.

In regular usage of the water heater, heat pump cycle 7 operates more efficiently at the smaller temperature difference between refrigerant flow path 8 and water flow path 9. Thus a heating amount needed in heat exchanger 10 is reserved in response to a water temperature detected by water temperature detector 21, and a refrigerant flow resistance disposed in decompressor 4 is controlled such that the temperature difference between path 8 and path 9 is minimized. Then a highly efficient operation is achievable.

According to exemplary embodiments 1-4, tap water is not only heated by the heat exchanger but also heated by the heater, so that the heater can make up for the shortage of heating the tap water by the heat exchanger. The heater does not influence directly to the heat exchanger that controls a temperature of hot water to be spouted, so that better control can be expected. Further, the heat exchange between the refrigerant and the water is carried out by the heat exchanger independently of the heater, so that an efficient heat exchange can be expected. The hot water in the heat accumulator is kept at a given temperature, even if the hot water supply operation is started with the compressor and the heat exchanger been kept cool, the hot water in the heat accumulator heats the water in any one of the water supply pipe, the heat exchanger or the hot water supply circuit, so that the hot water to be spouted always becomes ready quickly. The heat accumulator is kept hot by the heat pump, which results in better efficiency than using a heater instead of the heat pump, and since the heat pump cycle is driven at the start-up, the temperature of the hot water spouting becomes ready quicker. At least one of the water supply pipe, the water flow path or the hot water supply circuit is kept retaining heat, the hot water in the circulating path is spouted when the supply operation starts, so that the temperature of the hot water becomes appropriate quicker. The heat of the water flow path heats the heat exchanger, so that the heat pump cycle becomes ready quicker. The heat accumulator is formed in an optimal size, so that heat dissipation loss due to a bulky accumulator does not increase any more, and there is no worry about preparing a large space or a heavy weight of the accumulator. Further, the temperature of the hot water in the accumulator is set higher than the temperature of the hot water to be spouted, so that a density of heat accumulation can be raised for downsizing the heat accumulation. As a result, a smaller installation space and a lighter weight can be expected. The water to be used for hot water supply can be used as heat accumulating material, so that the water heater can be lighter if the water is drained before the transportation. The water has a specific heat large enough as a heat accumulating mass and can be handled safely.

Use of a super critical pressure heat pump cycle pressurizes the refrigerant flowing through the refrigerant flow path up to over the critical pressure with the compressor. Therefore, the refrigerant does not condense even if the water flowing through the water flow path deprives the refrigerant of heat and lowers the temperature of the refrigerant. As a result, a temperature difference can be produced with ease between the refrigerant flow path and the water flow path in the entire heat exchanger, hot water of high temperature is obtainable, and highly efficient heat exchange can be expected.

According to exemplary embodiments 1 and 4, the heat accumulator heats the water in any one of the water supply pipe, the heat exchanger, or the hot water supply circuit, and the heat quantity needed for this heating can be set at any amount by changing a flow rate on the side of the heat accumulator. The hot water supplied from the heat accumulator can be mixed, before being heated, at a given ratio with the water supplied from any one of the water supply pipe, the heat exchanger, or the hot water supply circuit, so that the hot water at a given temperature is obtainable immediately. The water supplied from the heat accumulator can be substituted for any one of the water supply pipe, the heat exchanger, or the hot water supply circuit, so that the hot water in the heat accumulator can be used at the start-up or a defrosting operation when the heat exchanger cannot heat sufficiently. As a result, a user does not feel dissatisfaction.

Exemplary Embodiment 5

Figure 5:
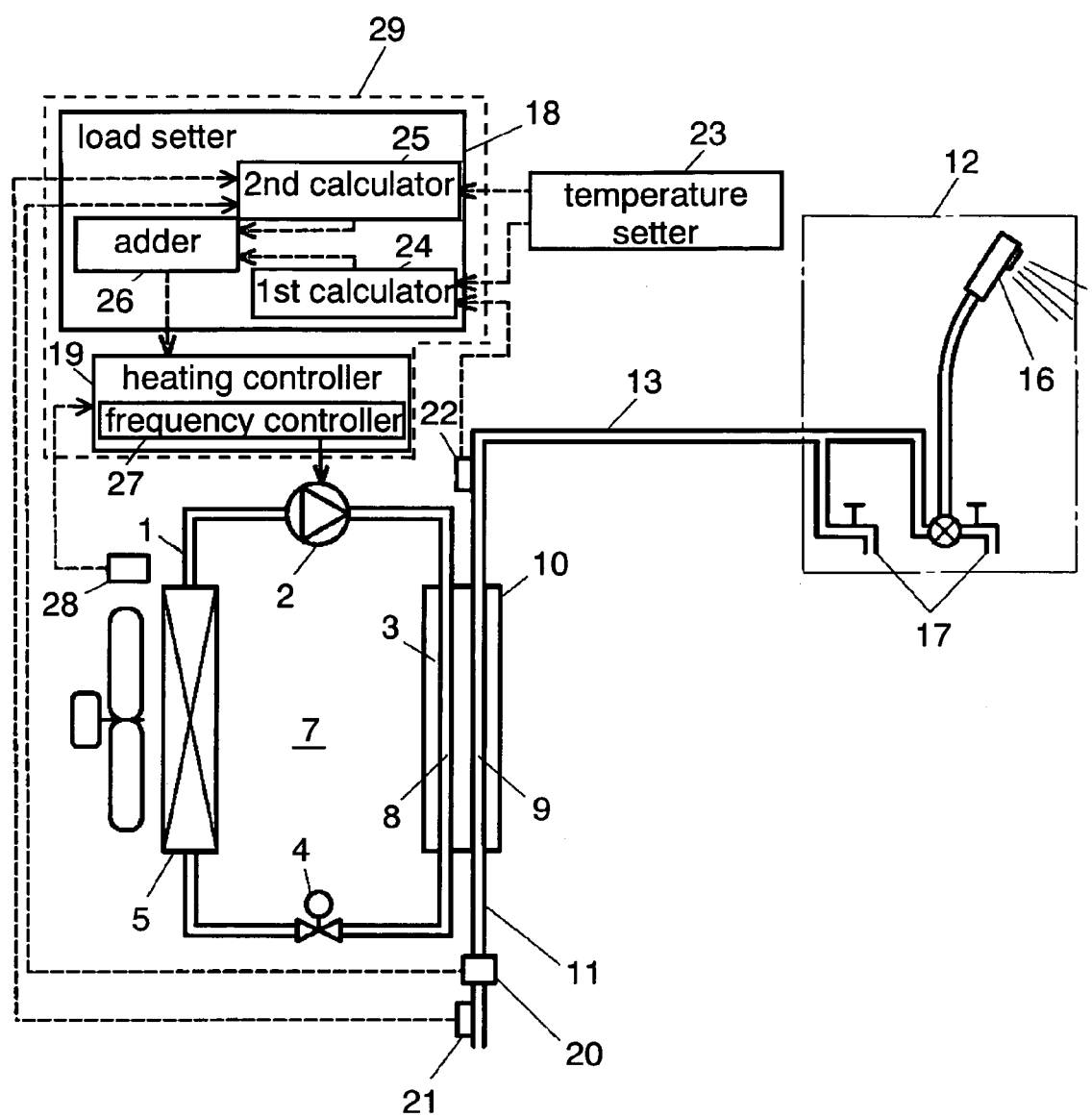
FIG. 5 shows a structure of a heat-pump water heater in accordance with a fifth exemplary embodiment of the present invention.

FIG. 5 shows a structure of a heat-pump water heater (a heat-pump hot water device) in accordance with the fifth exemplary embodiment of the present invention. In FIG. 5, heat pump 7 forms a closed circuit including compressor 2, radiator 3, decompressor 4, heat absorber 5, and refrigerant flow path 1 that couples the foregoing elements in the closed circuit. Heat exchanger 10 includes water flow path 9 that exchanges the heat with refrigerant flow path 8 of radiator 3. Water supply pipe 11 supplying tap water directly to water flow path 9 is coupled to hot water supply circuit 13 which leads hot water supplied from water flow path 9 to hot water supply terminal 12 such as shower face 16 or spout 17. Load setter 18 sets a heating amount needed at heat exchanger 10. Heating controller 19 controls the heating amount of exchanger 10 in response to the amount set by load setter 18. Water supply pipe 11 is equipped with flow rate detector 20 for detecting a flow rate of hot water supply circuit 13 and water temperature detector 21 for detecting a temperature of water supplied to heat exchanger 10. Circuit 13 is equipped with hot water temperature detector 22 for detecting a temperature of hot water supplied from path 9. A user can set a target temperature to meet the user's need with temperature setter 23.

Load setter 18 includes first calculator 24, second calculator 25 and adder 26. First calculator 24 calculates a first necessary heating amount based on a deviation between the hot water temperature detected by hot water temperature detector 22 and the target temperature output from temperature setter 23. Second calculator 25 calculates a second necessary heating amount based on respective outputs from water temperature detector 21, temperature setter 23, and flow rate detector 20. Adder 26 calculates a sum of the first and the second necessary heating amounts. Load setter 18 outputs the sum of necessary heating amount.

Heating controller 19 includes frequency controller 27 which changes a rotation speed of compressor 2, and controls the rotation speed in response to the necessary heating amount set by load setter 18. Heating controller 19 changes the rotation speed of compressor 2, one of operating condition of heat pump cycle, and controls the heating amount of heat exchanger 10 in response to an output from air temperature detector 28. The heating amount of exchanger 10 changes proportionate to the rotation speed which is changed in response to the air temperature. Therefore, heating controller 19 stores in advance a relation between the heating amount of heat exchanger 10 and the rotation speed of compressor 2 at every air temperature. Then controller 19 sets the rotation speed so that the heating amount of heat exchanger 10 can agree with the necessary heating amount set by load setter 18 in response to an air temperature. This mechanism allows controlling the hot water supply accurately in response to changes in the air temperature.

Load setter 18 and heating controller 19 form controller 29 which corresponds to controller 54 used in embodiments 1-4. Setter 18 and controller 19 can be integrated into one body.

An operation of the heat-pump water heater having the foregoing structure is demonstrated hereinafter. In FIG. 5, turning on of spout 17 leads tap water through water supply pipe 11. Flow rate detector 20 detects the water flow, and sends the signal to load setter 18, which then calculates a necessary heating amount. Heating controller 19 controls a rotation speed of compressor 2 based on the amount calculated. Then compressor 2 discharges refrigerant gas of high pressure and high temperature, and the gas flows into radiator 3, thereby heating the water flowing through path 9. The heated water is spouted from hot water supply terminal 12 via hot water supply circuit 13. The refrigerant cooled down in radiators 3, on the other hand, is decompressed by decompressor 4, and then flows into heat absorber 5, where the refrigerant absorbs natural energy such as atmospheric heat and solar heat, then vaporizes into gas before returning to compressor 2. Therefore, immediately after the detection of spouting the hot water, the refrigerant gas of high pressure and high temperature discharged from compressor 2 flows into radiator 3, then heats the water, and the heated water is spouted from hot water supply terminal 12.

During the hot water supply operation, first calculator 24 in load setter 18 calculates the first necessary heating amount based on the deviation between the temperature of the hot water spouting and the target temperature by using a control similar to that carried out in the first embodiment, namely, a feedback control of the temperature of the hot water spouting is carried out.

The first necessary heating amount can be determined using a changing rate of the deviation between the temperature of the hot water spouting and the target temperature. If the load of hot water supply changes due to a flow rate or a temperature of the water supplied during the hot water supply operation, a difference occurs in the changing rate of the deviation. For instance, in the identical heating amount, the temperature of the hot water spouting rises slower at the greater flow rate, and the temperature rises faster at the smaller flow rate. The correlation between this changing rate and the necessary heating amount is stored in advance, and the necessary heating amount is set based on the changing rate of the deviation between the temperature of the hot water spouted and the target temperature. This mechanism allows controlling the necessary heating amount more steadily and in a shorter time than the case of controlling the heating amount only with the temperature deviation.

On the other hand, second calculator 25 calculates the load of hot water supply, and uses this load as the second necessary heating amount. To be more specific, a difference between the target temperature and the temperature of the water supplied is multiplied by the flow rate detected by flow rate detector 20, and the product of this multiplication is found as the load of hot water supply, i.e., the second necessary heating amount. This is so called a control amount of feed-forward control. Adder 26 finds the total necessary heating amount by adding the first and the second necessary heating amounts. This feedback control amount of the necessary heating amount is incorporated, thereby regulating the temperature of the hot water spouting accurately at the target temperature. This control is also similar to a control done by controller 54 in embodiment 1.

In the water heater in accordance with the present embodiment, heat pump cycle 7 is formed of compressor 2, radiator 3, decompressor 4, heat absorber 5, and refrigerant flow path 1 that couples the foregoing elements in a closed circuit. Refrigerant flow path 1 extends through heat exchanger 10 that exchanges the heat with water flow path 9, which leads to hot water supply terminal 12 and forms hot water supply circuit 13. Load setter 18 for setting a heating amount needed in heat exchanger 10 and heating controller 19 for regulating the heating amount of exchanger 10 in response to the amount set by load setter 18 are also disposed in the water heater. The necessary heating amount set by load setter 18 includes a load of the hot water supply and a delay of heating response, this amount is needed as an amount to be exchanged in heat exchanger 10. Since heating controller 19 regulates the necessary heating amount of the heat exchanger in response to this amount to be exchanged, the hot water supply can be controlled at an appropriate level.

The water heater in accordance with this embodiment includes flow rate detector 20 for detecting a flow rate of the hot water supply circuit. Load setter 18 finds the necessary heating amount based on the flow rate detected by detector 20. The load of hot water supply is proportionate to the flow rate, so that the necessary heating amount found here correlates with the load of hot water supply. Thus if the load is suddenly changed due to a change of the flow-rate, the heating amount can be promptly controlled in response to the change in the load.

The water heater in accordance with this embodiment includes water temperature detector 21 for detecting the water flowing through the water supply pipe. Load setter 18 finds the necessary heating amount based on the temperature detected by detector 21. The load of hot water supply is proportionate to a difference between the temperature of the water supplied and the target temperature, thus the necessary heating amount increases as the temperature of water supplied lowers, and the heating amount decreases as the temperature rises. The necessary heating amount can be estimated based on the temperature of the water supplied, so that a temperature change in hot water spouting from terminal 12 due to the temperature change in the water supplied can be minimized.

The water heater in accordance with this embodiment includes temperature setter 23 for setting the target temperature of hot water spouting from terminal 12. This structure allows setting an accurate load of hot water supply as a necessary heating amount with respect to the spouting hot water temperature desired by a user with setting the target temperature via temperature setter 23.

The water heater in accordance with this embodiment includes hot water temperature detector 22. Load setter 18 calculates a necessary heating amount based on a deviation between the target temperature and the hot water temperature detected by detector 22. The necessary heat amount calculated here determines a load of hot water supply based on a changing rate in the deviation. If the load of hot water supply changes due to a flow rate or a temperature of the water supplied during the hot water supply operation, a difference occurs in the changing rate in the deviation between the temperature of the hot water and the target temperature. For instance, in the identical heating amount, the temperature of the hot water rises slower at the greater flow rate, and the temperature rises faster at the smaller flow rate. The necessary heating amount is set based on the changing rate, so that this mechanism allows controlling the necessary heating amount more steadily and in a shorter time than the case of controlling the heating amount only with the temperature deviation.

The water heater in accordance with this embodiment further includes water temperature detector 21 for detecting a temperature of water flowing through water supply pipe 11 and flow rate detector 20 for detecting a flow rate of hot water supply circuit 13. Load setter 18 calculates a first necessary heating amount associated with the feedback control based on the deviation between the temperature detected by detector 22 and the target temperature. Load setter 18 also calculates a second necessary heating amount associated with the feed-forward control based on the temperature detected by detector 21, the flow rate detected by detector 20, and the target temperature. A sum of the first and the second necessary heating amounts is calculated. The feed-forward control quickly sets a target heating amount, and the feedback control corrects a present amount if it deviates from the target amount. As a result, a control in quick response is achievable.

In the water heater in accordance with the present embodiment, heating controller 19 controls a rotation speed of compressor 2. In other words, a relation between the rotation speed and a heating amount in heat exchanger 10 is determined in advance, and the rotation speed is regulated such that the necessary heating amount determined is obtainable. This mechanism allows obtaining the necessary heating amount in a shorter time by regulating the rotation speed.

The water heater in accordance with this embodiment includes air temperature detector 28 for detecting an air temperature. Heating controller 19 changes the amount set by load setter 18 in response to an air temperature detected by detector 28, thereby controlling the heating amount in heat exchanger 10. An error of heating amount used in exchanger 10 due to a change in the air temperature is thus corrected. Heat pump cycle 7 uses atmospheric heat to absorb heat from heat absorber 5, so that the heating amount in exchanger 10 is greatly influenced by an air temperature. For instance, in the case of controlling the rotation speed of compressor 2, the heating amount changes depending on the air temperature although the identical rotation speed is used. The heating amount in exchanger 10 is controlled such that the influence by the air temperature is offset, thereby controlling accurately the hot water supply.

In this embodiment, adder 26 calculates the sum of the first and the second necessary heating amounts to find the necessary heating amount. However, the first necessary heating amount can be straightly used as the necessary heating amount, and the second necessary heating amount also can be straightly used as the necessary heating amount. Those two amounts are not necessarily added together, but can be switched therebetween in response to a lapse of hot water supply time or a temperature of hot water spouting. Those two amounts can be multiplied by coefficients respectively before they are added together. Further, a case using those two amounts independently can be switched to a case using those two amounts added together. As such, a combination of those two amounts or a condition of adding those two amounts can be changed, so that more stable control or faster control can be achieved depending on the condition of hot water supply.

In this embodiment, second calculator 25 calculates the load of hot water supply as the second necessary heating amount by multiplying the deviation between the temperature of the water supplied and the target temperature, and the flow rate together. However, if a rough outline of the load of hot water supply is acceptable, an estimated value determined by multiplying the flow rate and a given constant together can be used. In this case, accuracy of calculating the load becomes not so good; however, water temperature detector 21 and temperature setter 23 can be omitted, so that a cost reduction can be expected.

Further, for calculating the load of hot water supply, second calculator 25 can use an estimated value, which is determined by multiplying a difference between the temperature of the supplied water and a tentative target temperature, and a given constant together. In this case, accuracy of calculating the load becomes not so good; however, flow rate detector 20 and temperature setter 23 can be omitted, so that a cost reduction can be expected. In this case, a flow rate switch for detecting a start-up of the hot water supply operation is needed.

Exemplary Embodiment 6

Figure 6:
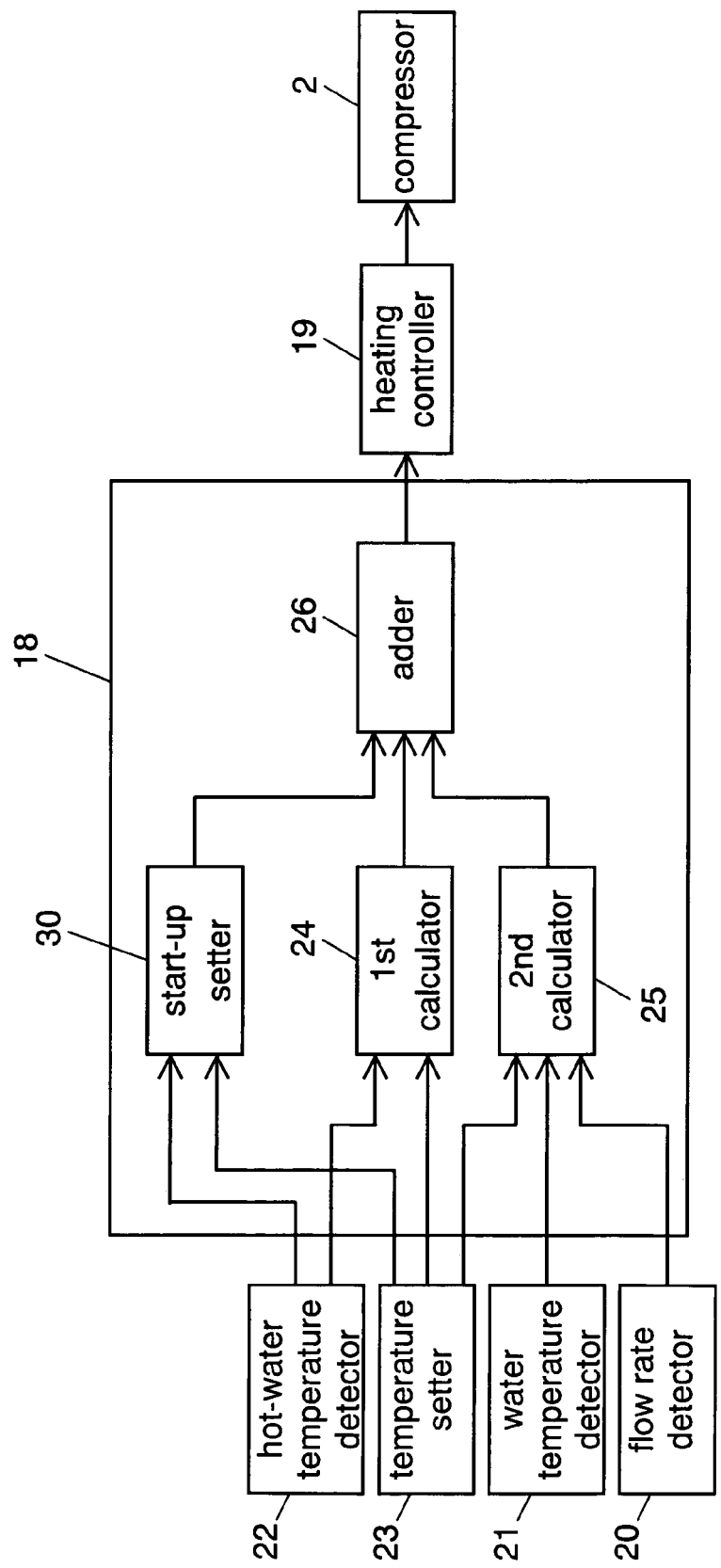
FIG. 6 is a block diagram showing a control of a heat-pump water heater in accordance with a sixth exemplary embodiment of the present invention.

FIG. 6 is a block diagram showing a control of a heat-pump water heater (a heat-pump hot water device) in accordance with the sixth exemplary embodiment of the present invention. The structure shown in FIG. 6 differs from that of the fifth embodiment in the structure of load setter 18. Namely, load setter 18 used in the this sixth embodiment includes start-up setter 30 for setting a heat quantity in response to a delay in heat response of heat pump cycle 7 or heat exchanger 10. When adder 26 calculates a necessary heating amount, the heat quantity set by start-up setter 30 is added to the amount. In the case of starting the hot water supply with heat-pump cycle 7 been kept cool, another heating amount than a load of hot water supply is needed before the operation becomes normal and stable, i.e., until the temperatures of compressor 2 and radiator 3 rise, and until the temperature of heat absorber 5 lowers. The heat quantity in response to the delay in heat response indicates this another amount discussed above.

This heat quantity can be found by multiplying a difference between the temperature of cycle 7 or exchanger 10 before they start operating and the temperature at normal operation, and the heat capacity together. However, the temperature at the normal operation largely differs depending on sections. Thus the sixth embodiment adopts the temperature difference as a typical value between a temperature detected before the operation by hot water temperature detector 22 and the temperature set by temperature setter 23, then this typical value is multiplied by a coefficient for determining the heat quantity. The heat quantity determined by start-up setter 30 is the total heat quantity needed for the start-up, thus it is necessary to convert the quantity to a quantity per unit time for controlling compressor 2. For this reason, adder 26 adds the load of hot water supply calculated by second calculator 25 and the heat quantity set by setter 30 together, then this added quantity is divided by the maximum heating amount at the maximum rotation speed of compressor 2 for finding an operating time at this maximum heating amount. Next, the heating amount needed for this operating time is set as the maximum heating amount for compressor 2. When this operating time is over, adding of the heating amount set by start-up setter 30 is ended, and the operation is restored to that in the fifth embodiment.

As discussed above, in the sixth embodiment, the heat quantity corresponding to a delay in heat response of heat pump cycle 7 or heat exchanger 10 is added to the load of hot water supply, and compressor 2 is heated with the maximum heating amount by the heat quantity corresponding to the delay. In other words, load setter 18 in this embodiment includes start-up setter 30 that determines the heat quantity corresponding to the delay in heat response of heat pump cycle 7 or heat exchanger 10. When a necessary heating amount is set, this quantity set by setter 30 is added. As a result, heating control incorporating the compensation for the delay in heat response can be achieved when the hot water supply starts or the load of hot water supply changes, thereby minimizing the delay in heat response.

The heat quantity corresponding to the delay in heat response can be found by multiplying a temperature difference between a temperature detected before operation by hot water temperature detector 22 and a temperature set by temperature setter 23, and a coefficient together. This method needs no special detector, so that an inexpensive control can be expected.

In the sixth embodiment, the heat quantity corresponding to the delay in heat response can be found by multiplying a temperature difference between a temperature detected before operation by hot water temperature detector 22 and a temperature set by temperature setter 23, and a coefficient together. However, a temperature of heat exchanger 10, compressor 2, heat absorber 5 or a discharging section of compressor 2 in refrigerant flow path 1 can be used.

Exemplary Embodiment 7

Figure 7:
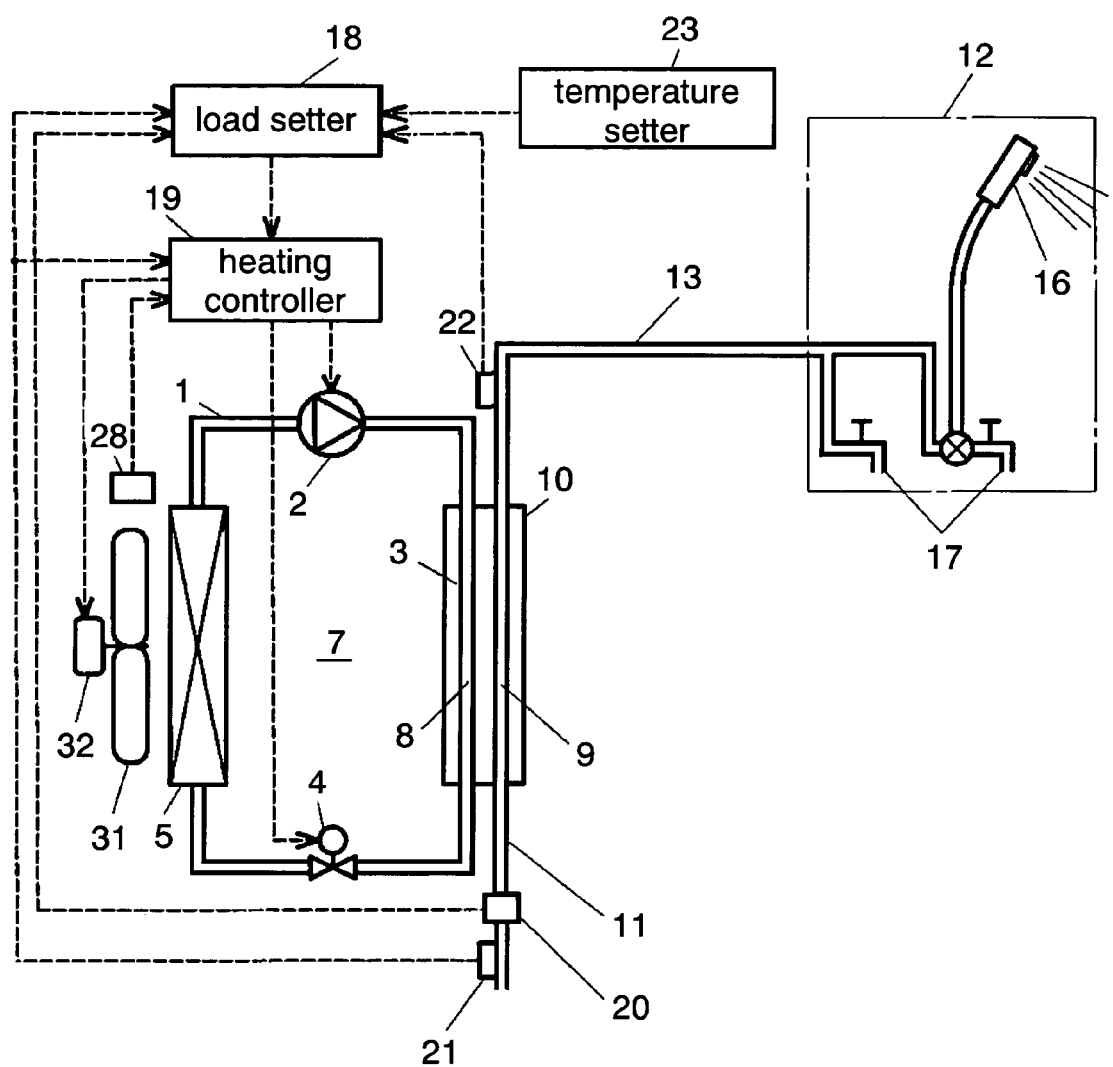
FIG. 7 shows a structure of a heat-pump water heater in accordance with a seventh exemplary embodiment of the present invention.

FIG. 7 shows a structure of a heat-pump water heater (a heat-pump hot water device) in accordance with the seventh exemplary embodiment of the present invention. The structure shown in FIG. 7 differs from that of the fifth embodiment in heating controller 19. Controller 19 in this embodiment controls not only compressor 2, but also controls both of a refrigerant-flow-path resistor disposed in decompressor 4 and an absorbing heat amount of heat absorber 5.

Decompressor 4 includes a throttle valve (not shown) and a stepping motor (not shown) for driving the throttle valve, and changes the refrigerant path resistor by driving the throttle valve. Heating controller 19 determines in advance a relation between the resistor in decompressor 4 and a heating amount in heat exchanger 10, and controls the resistor such that the necessary heating amount set by load setter 18 is achieved. In the case of lack of heating amount, such as hot water of high temperature is needed or outside air-temperature is low, the resistor is boosted so that the heat exchanger 10 can reserve a necessary heating amount.

In a normal hot water supply operating status, a smaller temperature difference between refrigerant flow path 8 and water flow path 9 increases efficient of heat pump cycle 7. Thus in response to a water temperature detected by detector 21, the necessary heating amount in heat exchanger 10 is reserved, then the refrigerant resistor is controlled such that the temperature difference between path 8 and path 9 decreases for more efficient operation.

A heat absorbing amount is controlled by changing a rotation speed of motor 32 of fan 31, i.e., changing a blowing volume to heat absorber 5. Heating controller 19 determines in advance a relation between the air quantity of fan 31 and the heating amount in heat exchanger 10, then controls the air quantity of fan 31 such that the necessary heating amount set is obtainable. In the case of an extremely small load of hot water supply, and when an extremely small heating amount needed in heat exchanger 10 causes the control of the rotation speed of compressor 2 to be unable to control the heating amount, then the air quantity of fan 31 is reduced. The heating amount in heat exchanger 10 can be thus reduced and regulated to a heating amount needed. When a heating amount is short at the maximum rotation speed of compressor 2, an air quantity of fan 31 is increased so that the heating amount in heat exchanger 10 can increase, thereby obtaining a heating amount needed.

As discussed above, the water heater in accordance with this embodiment proves that heating controller 19 controls the refrigerant-flow-path resistor disposed in decompressor 4. In other words, heating controller 19 determines in advance a relation between the resistor and a heating amount at heat exchanger 10, and controls the resistor such that the necessary heating amount is achievable. In the case of lack of heating amount, such as hot water of high temperature is needed or outside air-temperature is low, the resistor is boosted so that the heat exchanger 10 can reserve the necessary heating amount. The resistor is controlled in response to the water temperature detected by detector 21. Namely, a relation between a heating amount in heat exchanger 10 and the resistor in response to a temperature of water supplied is determined in advance, then the resistor is controlled such that the necessary heating amount set is obtainable. In the case of lack of heating amount, such as hot water of high temperature is needed or outside air-temperature is low, the resistor is boosted so that the heat exchanger 10 can reserve a necessary heating amount. During a normal hot water supply operation, the resistor can be controlled in response to the temperature of water supplied such that the most efficient heating amount is obtainable.

The water heater in accordance with this embodiment proves that heating controller 19 controls an absorbing heat amount of heat absorber 5. A heat amount absorbed heat absorber 5 from atmospheric heat is controlled by an air quantity of fan 31. A relation of an air quantity of fan 31 and the heating amount in heat exchanger 10 is determined in advance, and the air quantity of fan 31 is controlled such that the necessary heating amount set is obtainable. In the case of an extremely small load of hot water supply, and when an extremely small heating amount needed in heat exchanger 10 causes the control of the rotation speed of compressor 2 to be unable to control the heating amount, the air quantity of fan 31 is reduced. The heating amount in heat exchanger 10 can be thus reduced and regulated to a heating amount needed.

Exemplary Embodiment 8

Figure 8:
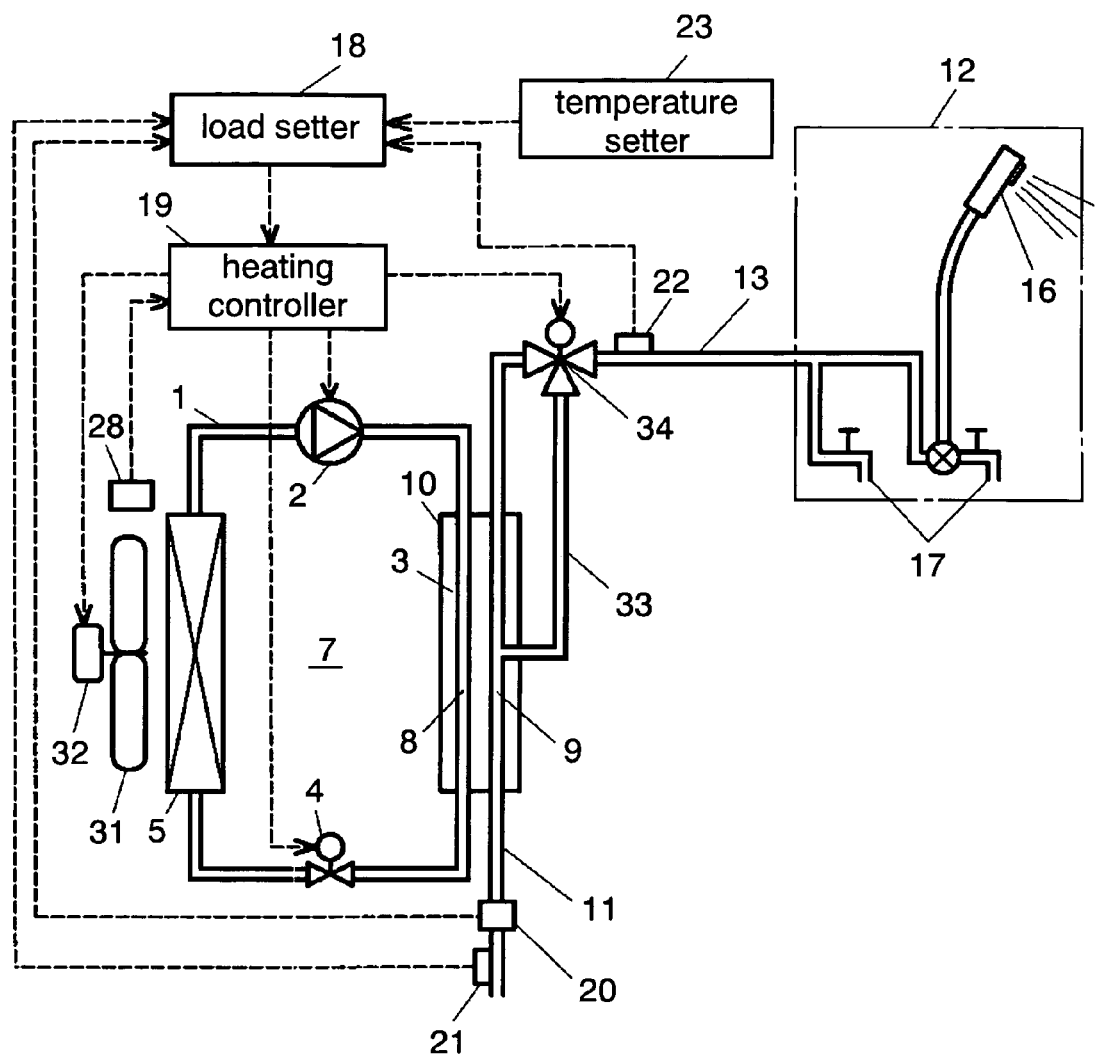
FIG. 8 shows a structure of a heat-pump water heater in accordance with an eighth exemplary embodiment of the present invention.

FIG. 8 shows a structure of a heat-pump water heater (a heat-pump hot water device) in accordance with the eighth exemplary embodiment of the present invention. The structure shown in FIG. 8 differs from that of the fifth embodiment in the presence of branch pipe 33, which is routed from the center of water flow path 9 in heat exchanger 10 to mixing valve 34 disposed at hot water supply circuit 13. Branch pipe 33 is coupled to valve 34 for changing a heat transfer condition of exchanger 10. This structure allows heating controller 19 to regulate the water volume in the down stream of path 9 from pipe 33 by controlling an opening of valve 34. Regulating a flow rate and a flow speed in path 9, and changing a heat transfer condition of path 8 and path 9 thus controls the heating amount in heat exchanger 10. A lower water volume decreases a heat conductivity of path 9, and as a result, a heating amount decreases. Stop of water flow in the downstream of path 9 from branch pipe 33 stops the heat exchange. This is just the same effect as the heat transferable area is halved. As such, a change in the length of the water flow path or a water volume changes the heating amount proportionately. A change in these conditions immediately changes a heating amount, so that a control with an improved heat response is achievable. This structure allows dealing with a case when a necessary heating amount is suddenly changed.

As discussed above, the water heater in accordance with this embodiment proves that heating controller 19 regulates the heat transfer conditions such as a flow rate or a flow speed in water flow path 9 within heat exchanger 10, thereby controlling the heating amount. To be more specific, the length of the water flow path or the water volume in heat exchanger 10 is changed. Since the heating amount in exchanger 10 is proportionate to the heat transfer area and the heat conductivity, a change in the path length or the water volume can change the heating amount proportionately. A change in those conditions can immediately change the heating amount. As a result, a control with improved heat response is achievable.

In the eighth embodiment, branch pipe 33 is routed from the center of heat exchanger 10; however, the stream above exchanger 10 can be branched and bypassed exchanger 10, so that the flow rate of the entire flow passing through exchanger 10 can be changed. A branch in the upper stream or in the down stream of exchanger 10 will produce a similar advantage.

Load setter 18 and heating controller 19 discussed in embodiments 5-8 can be included in controller 54 described in embodiments 1-4. In this case, a temperature of hot water supply can be controlled more elaborately, and a better follow-up to a change in the load of hot water supply can be expected.

Exemplary Embodiment 9

Figure 9:
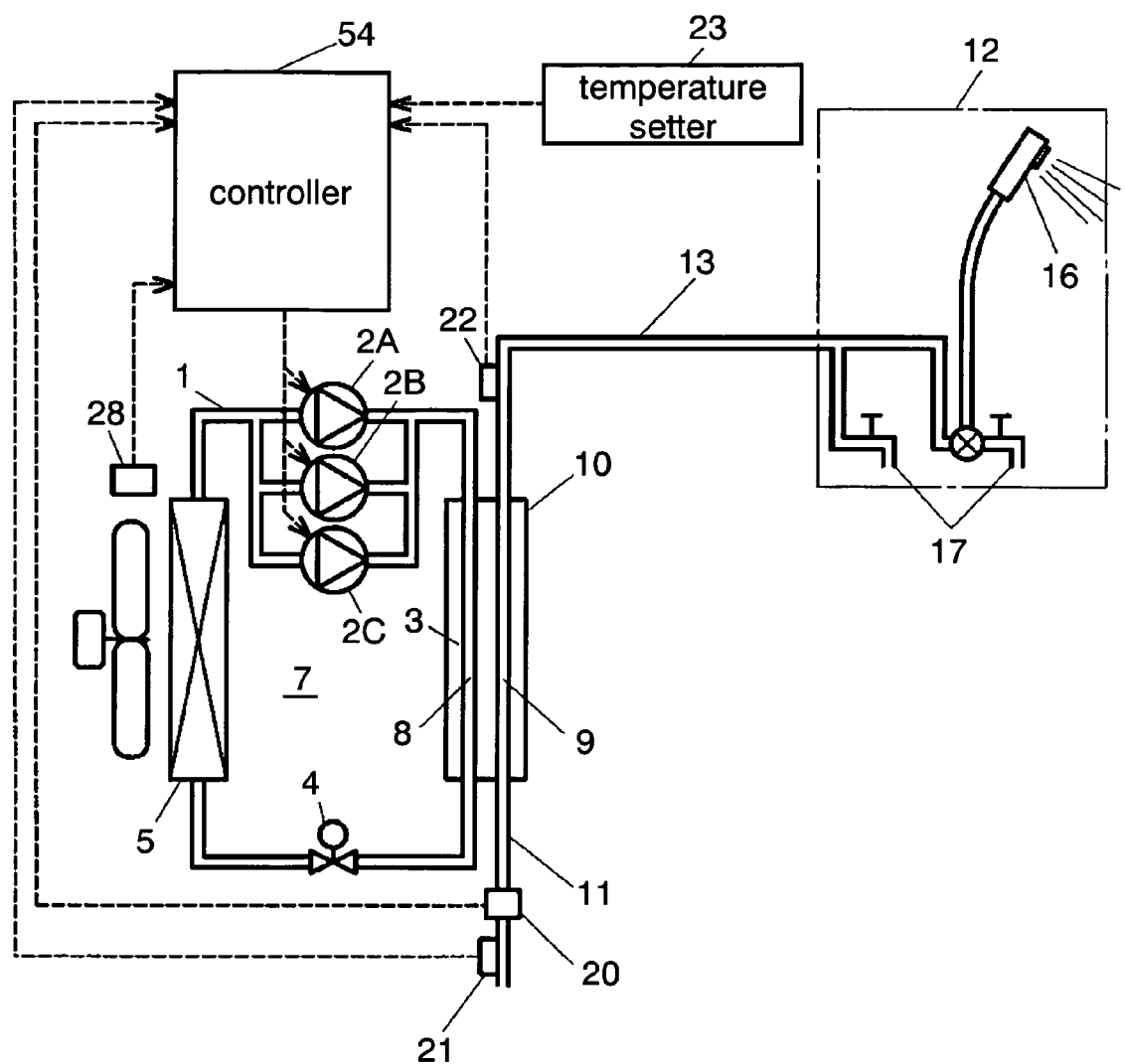
FIG. 9 shows a structure of a heat-pump water heater in accordance with a ninth exemplary embodiment of the present invention.

FIG. 9 shows a structure of a heat-pump water heater (a heat-pump hot water device) in accordance with the ninth exemplary embodiment of the present invention. As shown in FIG. 9, three compressors 2A, 2B and 2C are disposed in heat pump cycle 7 in parallel wit each other, and controller 54 controls the number of active compressors and a rotation speed of each one of them. In this embodiment, controller 54 regulates the rotation speed of compressor 2A for adjusting the heating capacity elaborately, and turning on or off compressors 2B and 2C. When a large capacity is required to a load of hot water supply such as for taking a shower or preparing for bathing, two or three compressors are involved. When an extremely small load is required such as for washing dishes in summer, operating only compressor 2A is enough. This structure thus can deal with a large change in the load of hot water supply.

The water heater in accordance with this embodiment equips heat pump cycle 7 with a plurality of compressors such as compressors 2A, 2B and 2C, and controller 54 controls the number of active compressors. When a sharp change in the load of hot water supply is expected, there is a limit to a controllable range in the case of using only one compressor, and a satisfactory control on the hot water supply cannot be expected. However, this structure allows controlling the number of active compressors, so that the number of active compressors can be changed in response to the load, and the water heater can deal with a large change in the load.

The number of compressors may be two, or more than three with a similar advantage to what discussed above. Each one of rotation speed of all the compressors can be controlled, so that a switch of the number of active compressors can be carried out smooth. The compressors can be coupled in series, so that a discharging pressure can be regulated.

Exemplary Embodiment 10

Figure 10:
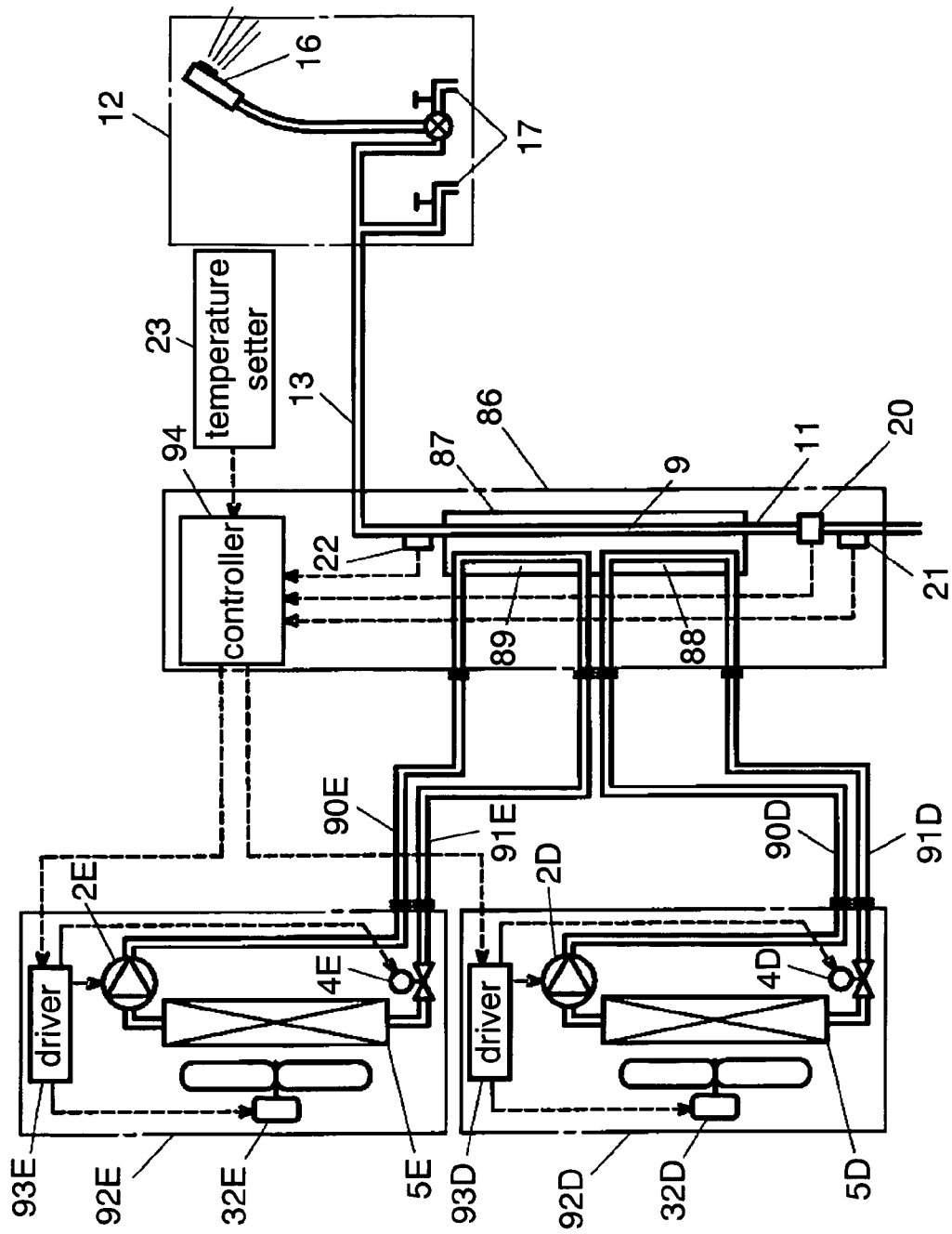
FIG. 10 shows a structure of a heat-pump water heater in accordance with a tenth exemplary embodiment of the present invention.
Figure 11:
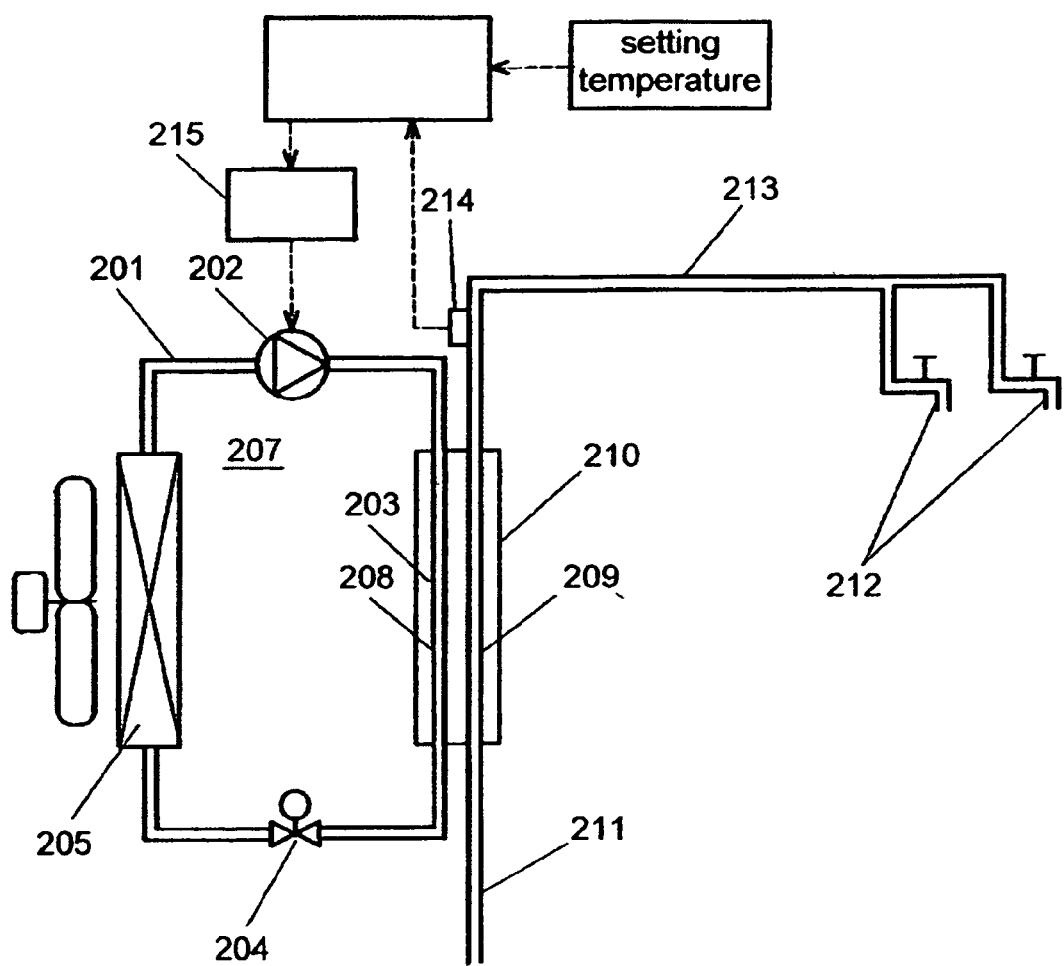
FIG. 11 shows a structure of a conventional heat-pump water heater.

FIG. 10 shows a structure of a heat-pump water heater (a heat-pump hot water device) in accordance with the tenth exemplary embodiment of the present invention. As shown in FIG. 10, the heat-pump water heater includes two heat pump cycles. First heat pump cycle has first unit 92D disposed outside as an outdoor unit, and including the following elements:

heat absorber 5D including fan 32D;
compressor 2D;
decompressor 4D; and
driver 93D.

Second heat-pump cycle has second unit 92E disposed also outside as an outdoor unit, and including the following elements:

heat absorber 5E including fan 32E;
compressor 2E;
decompressor 4E; and
driver 93E.

Third unit 86 includes heat exchanger 87 coupled to water supply pipe 11 and hot water supply pipe 13, and is disposed indoors.

Heat exchanger 87 includes radiator 88 on the upper stream side of water flow path 9 and radiator 89 on the downstream side, and two radiators 88, 89 heat the water flowing through path 9. Refrigerant flow paths 90D and 91D couple first unit 92D to radiator 88 of third unit 86. Refrigerant flow paths 90E and 91E couple second unit 92E to radiator 89 of third unit 86. In response to a calculated load of hot water supply, controller 94 outputs an operating instruction to drivers 93D and 93E for controlling the heating. Second unit 92E can be halted or each rotation speed of compressors 2D and 2E can be regulated depending on the calculated load, thereby supplying the hot water at a target temperature. A combination of controller 94 and driver 93D or 93E corresponds to controller 54 described in embodiments 1-4, or controller 29 described in embodiments 5-8. Load setter 18 and heating controller 19 described in embodiments 5-8 can be included in any one of controller 94, driver 93D or driver 93E.

The foregoing structure allows changing the maximum hot water supply capacity by increasing or decreasing the number of active heat pumps, so that a hot water supply capacity different depending on the number of family members can be adjusted with ease by changing the number of active heat pumps. Two heat pump cycles are divided into three units, so that the weight can be dispersed for easier transport and installation.

When a sharp change in the load of hot water supply is expected, there is a limit of a controllable range in the case of using only one heat pump, and a satisfactory control on the hot water supply cannot be expected. However, according to this embodiment, two heat pumps are prepared, the number of active heat pumps or the rotation speed of compressor is controlled, so that the hot water supply capacity can be largely changed in response to the load of hot water supply. At the start-up, two heat pumps are operated at full blast for the hot water to become ready quickly. In the case of a small load of hot water supply, one heat pump cycle out of two can be halted, so that efficient operation is achievable at the light load.

In this embodiment, radiators 88 and 89 of heat exchanger 86 are placed on the upper stream side and the downstream side respectively in series with respect to path 9; however, they can be placed in parallel with water flow path 9. In this case, a water temperature at the inlet of path 9 can be identical to the respective radiators by using tap water, so that a heat exchange efficiency can increase. As discussed above, two radiators are placed in parallel and path 9 is branched into two parallel lines, so that they run face to face. This structure allows two radiators to be controlled its heating amount independently. In this case, plural heat exchangers can be disposed in parallel. Further, a mixing ratio at the converging point of the water flow paths disposed in parallel can be controlled, so that a temperature of the hot water can be regulated.

Similar to the other embodiments, air temperature detector 28 can be prepared, and the detection is input to controller 94 to reflect it to the control of drivers 93D and 93E, so that the hot water supply capacity can be controlled more elaborately.

In this embodiment, two heat pump cycles are used; however, more numbers of heat pump cycles can vary a hot water supply of much larger capacity in a substantially wider range. Two heat-pump cycles are divided into three units; however, they can be integrated into one unit. In this case, the hot water supply capacity also increases. This control method, namely, the water heater equipped with plural heat pump cycles can control the number of active units and the rotation speed of the compressor, can be applied to the embodiments 1-9, so that the follow-up to the load of hot water supply can be improved.

INDUSTRIAL APPLICABILITY

The present invention provides a flash water heater using a heat pump. This device is excellent in start-up of a hot water temperature, follow-up to a change in a load of hot water supply, and controllability, and efficient hot water supply can be expected.

The invention claimed is:

1. A heat-pump hot water device comprising:
   a heat pump cycle including:
   a compressor;
   a radiator;
   a decompressor;
   a heat absorber; and
   a refrigerant flow path that couples the compressor, the radiator, the decompressor and the heat absorber in a closed circuit;
   a heat exchanger including a water flow path that exchanges heat with the refrigerant flow path;
   a water supply pipe for supplying tap water to the water flow path;
   a hot water supply circuit for directing the water from the water flow path to a hot water supply terminal; and
   a heater for heating the water flowing through any one of the water supply pipe, the water flow path and the hot water supply circuit,
   wherein the heater includes a heat accumulator disposed in series with any one of the water supply pipe, the heat exchanger and the hot water supply circuit.

2. The heat-pump hot water device of claim 1, wherein the heater includes a mixer which mixes water heated by the heat accumulator with the water of any one of the water supply pipe, the heat exchanger, and the hot water supply circuit.

3. The heat-pump hot water device of claim 1, wherein the heater includes a switcher which directs water heated by the heat accumulator to any one of the water supply pipe, the heat exchanger, and the hot water supply circuit, and directs the water of the water supply pipe, the heat exchanger, and the hot water supply circuit to the heat accumulator.

4. The heat-pump hot water device of claim 1, wherein the heater includes a heat retainer for maintaining a temperature of a heat accumulating mass at a given temperature.

5. The heat-pump hot water device of claim 4, wherein the heat retainer includes the radiator.

6. The heat-pump hot water device of claim 1, wherein the heater includes a circulating water path that has at least one of the water supply pipe, the heat exchanger, and the hot water supply circuit, and the heater maintains a temperature of water circulating in the circulating water path.

7. The heat-pump hot water device of claim 6, wherein the heat-pump cycle for the water flow path maintains the temperature of the water circulating in the circulating water path.

8. The heat-pump hot water device of claim 6 wherein the circulating water path includes a heat accumulator.

9. The heat-pump hot water device of claim 1, wherein a temperature of a heat accumulating mass in the heat accumulator is set higher than a temperature of hot water supplied from the hot water supply circuit.

10. The heat-pump hot water device of claim 1, wherein the heat accumulator includes a storage tank which stores water in at least one of the water supply pipe, the heat exchanger and the hot water supply circuit.

11. The heat-pump hot water device of claim 1, wherein the heat-pump cycle is a super critical pressure heat pump cycle wherein refrigerant pressure exceeds a critical pressure, and wherein a refrigerant above its critical pressure heats water flowing through the water flow path in the heat exchanger.

12. The heat-pump hot water device of claim 1, wherein a flow direction of the refrigerant flow path is opposite to a flow direction of the water flow path in the heat exchanger.

13. A heat-pump hot water device comprising:
a heat pump cycle including:
a compressor;
a radiator;
a decompressor;
a heat absorber; and
a refrigerant flow path that couples the compressor, the radiator, the decompressor and the heat absorber in a closed circuit;
a heat exchanger including a water flow path that exchanges heat with the refrigerant flow path;
a water supply pipe for supplying tap water to the water flow path;
a hot water supply circuit for directing the water from the water flow path to a hot water supply terminal; and
a heater for heating the water flowing through any one of the water supply pipe, the water flow path and the hot water supply circuit,
wherein the heater includes a heat accumulator disposed in parallel with any one of the water supply pipe, the heat exchanger and the hot water supply circuit.

14. The heat-pump hot water device of claim 13, wherein the heater includes a mixer which mixes water heated by the heat accumulator with the water of any one of the water supply pipe, the heat exchanger, and the hot water supply circuit.

15. The heat-pump hot water device of claim 13, wherein the heater includes a switcher which directs water heated by the heat accumulator to any one of the water supply pipe, the heat exchanger, and the hot water supply circuit, and directs the water of the water supply pipe, the heat exchanger, and the hot water supply circuit to the heat accumulator.

16. The heat-pump hot water device of claim 13, wherein the heater includes a heat retainer for maintaining a temperature of a heat accumulating mass at a given temperature.

17. The heat-pump hot water device of claim 16, wherein the heat retainer includes the radiator.

18. The heat-pump hot water device of claim 13, wherein a temperature of a heat accumulating mass in the heat accumulator is set higher than a temperature of hot water supplied from the hot water supply circuit.

19. The heat-pump hot water device of claim 13, wherein the heat accumulator includes a storage tank which stores water in at least one of the water supply pipe, the heat exchanger and the hot water supply circuit.

20. The heat-pump hot water device of claim 13, wherein the heat-pump cycle is a super critical pressure heat pump cycle wherein refrigerant pressure exceeds a critical pressure, and wherein a refrigerant above its critical pressure heats water flowing through the water flow path in the heat exchanger.

21. The heat-pump hot water device of claim 13, wherein a flow direction of the refrigerant flow path is opposite to a flow direction of the water flow path in the heat exchanger.

* * * * *